US012148603B2

(12) United States Patent
Quarmby et al.

(10) Patent No.: US 12,148,603 B2
(45) Date of Patent: Nov. 19, 2024

(54) METHODS AND SYSTEMS FOR TUNING A MASS SPECTROMETER

(71) Applicant: THERMO FINNIGAN LLC, San Jose, CA (US)

(72) Inventors: Scott T. Quarmby, Round Rock, TX (US); Giacinto Zilioli, Cernusco sul Naviglio (IT); Charles H. Vogt, Austin, TX (US); Dustin J. Kreft, Round Rock, TX (US); Nathaniel L. Sanders, Austin, TX (US); George B. Guckenberger, Austin, TX (US); John G. Voss, Round Rock, TX (US)

(73) Assignee: Thermo Finnigan LLC, San Jose, CA (US)

( * ) Notice: Subject to any disclaimer, the term of this patent is extended or adjusted under 35 U.S.C. 154(b) by 301 days.

(21) Appl. No.: 17/684,640

(22) Filed: Mar. 2, 2022

(65) Prior Publication Data

US 2022/0270867 A1 Aug. 25, 2022

Related U.S. Application Data

(62) Division of application No. 16/600,325, filed on Oct. 11, 2019, now Pat. No. 11,282,685.

(51) Int. Cl.

*H01J 49/02* (2006.01)
*H01J 49/00* (2006.01)
*H01J 49/42* (2006.01)

(52) U.S. Cl.

CPC ........ *H01J 49/0027* (2013.01); *H01J 49/025* (2013.01); *H01J 49/4295* (2013.01); *H01J 49/429* (2013.01)

(58) Field of Classification Search

CPC .. H01J 49/0027; H01J 49/0031; H01J 49/025; H01J 49/4295; H01J 49/429

See application file for complete search history.

(56) References Cited

U.S. PATENT DOCUMENTS 5,498,545 A * 3/1996 Vestal ................. H01J 49/0495 250/423 P
7,186,973 B2 3/2007 Terui et al.
8,193,484 B2 * 6/2012 Quarmby .............. H01J 49/025 250/397
8,426,805 B2 4/2013 McCauley
8,704,162 B1 4/2014 Shiohama (Continued)

FOREIGN PATENT DOCUMENTS

EP 2782116 A1 9/2014

OTHER PUBLICATIONS

Beavis et al., "Artificial Intelligence and Expert Systems in Mass Spectrometry", Encyclopedia of Analytical Chemistry (2006), pp. 1-40.

(Continued)

*Primary Examiner* — David E Smith

(57) ABSTRACT

A tuning system may acquire, from a mass spectrometer during a batch of one or more analytical runs performed with the mass spectrometer, tune data associated with an operating characteristic of the mass spectrometer. The tuning system may determine, based on the tune data, a value of an operating parameter configured to adjust the operating characteristic of the mass spectrometer and set the operating parameter to the determined value.

13 Claims, 11 Drawing Sheets

(56) References Cited

U.S. PATENT DOCUMENTS

| | | | | |
|---|---|---|---|---|
| 9,324,543 | B2 * | 4/2016 | Kenny | H01J 49/40 |
| 11,282,685 | B2 * | 3/2022 | Quarmby | H01J 49/0009 |
| 2009/0299671 | A1 | 12/2009 | Jones et al. | |
| 2013/0043380 | A1 | 2/2013 | Correale | |
| 2013/0099113 | A1 | 4/2013 | Quimby et al. | |
| 2015/0235827 | A1 | 8/2015 | Bazargan et al. | |
| 2015/0279649 | A1 | 10/2015 | Yamaguchi | |
| 2016/0181076 | A1 | 6/2016 | Smith | |
| 2018/0286647 | A1 | 10/2018 | Guckenberger et al. | |
| 2020/0124576 | A1 | 4/2020 | Kobold et al. | |

OTHER PUBLICATIONS

Brand et al., "Application of knowledge based systems technology to triple quadrupole mass spectrometry (Tqms)", AAAI-86, Proceedings: Fifth National Conference on Artificial Intelligence, 1986, pp. 812-817.

William J. Fies, Jr., "A Method for Measuring the Gain of an Electron Multiplier," Int. J. Mass Spectrom. Ion Processes, 82 (1988), pp. 111-129.

* cited by examiner

METHODS AND SYSTEMS FOR TUNING A MASS SPECTROMETER

CROSS-REFERENCE TO RELATED APPLICATION

This application is a divisional under 35 U.S.C. § 121 and claims the priority benefit of co-pending U.S. patent application Ser. No. 16/600,325, filed Oct. 11, 2019. The disclosure of the foregoing application is incorporated herein by reference.

BACKGROUND INFORMATION

A mass spectrometer is an analytical instrument that may be used for qualitative and/or quantitative analysis of a sample. A mass spectrometer generally includes an ion source for producing ions from the sample, a mass analyzer for separating the ions based on their ratio of mass to charge, and an ion detector for detecting the separated ions. The mass spectrometer uses the detected signals from the ion detector to construct a mass spectrum that shows a relative abundance of each of the detected ions as a function of their mass-to-charge (m/z) ratio. By analyzing the mass spectrum generated by the mass spectrometer, a user may be able to identify substances in a sample, measure the relative or absolute amounts of known components present in the sample, and/or perform structural elucidation of unknown components.

The mass spectrometer may be tuned to ensure that the mass spectrometer produces accurate data and meets prescribed criteria for particular methodologies. Tuning may adjust operating parameters for a variety of hardware components of the mass spectrometer, such as the voltage applied to one or more electrodes of the mass analyzer. An autotune process may automatically check various different operating characteristics of the mass spectrometer, such as mass resolution, mass position, detector gain, and sensitivity, and adjusts various operating parameters for a variety of components of the mass spectrometer to optimize the operating characteristics for a particular set of tuning criteria, a particular method, or a particular analytical sample.

However, the autotune process can be slow and requires a significant span of time dedicated to performing the autotune, valuable time that could otherwise be spent analyzing analytical samples. As a result, some users may skip performing an autotune or may perform an autotune process less frequently than might be recommended.

SUMMARY

The following description presents a simplified summary of one or more aspects of the methods and systems described herein in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some exemplary embodiments a method comprises acquiring, by a tuning system from a mass spectrometer during a batch of one or more analytical runs performed with the mass spectrometer, tune data associated with an operating characteristic of the mass spectrometer; determining, by the tuning system based on the tune data, a value of an operating parameter configured to adjust the operating characteristic of the mass spectrometer; and setting, by the tuning system, the operating parameter to the determined value.

In some exemplary embodiments a system comprises a memory storing instructions and a processor communicatively coupled to the memory and configured to execute the instructions to acquire, from a mass spectrometer during a batch of one or more analytical runs performed with the mass spectrometer, tune data associated with an operating characteristic of the mass spectrometer; determine, based on the tune data, a value of an operating parameter configured to adjust the operating characteristic of the mass spectrometer; and set the operating parameter to the determined value.

In some exemplary embodiments a non-transitory computer-readable medium stores instructions that, when executed, direct at least one processor of a computing device to acquire, from a mass spectrometer during a batch of one or more analytical runs performed with the mass spectrometer, tune data associated with an operating characteristic of the mass spectrometer; determine, based on the tune data, a value of an operating parameter configured to adjust the operating characteristic of the mass spectrometer; and set the operating parameter to the determined value.

In some exemplary embodiments the tune data is acquired during one or more idle-time periods occurring during the batch of one or more analytical runs.

In some exemplary embodiments the mass spectrometer is coupled with a chromatograph and the one or more idle-time periods comprises a stabilization period of the chromatograph.

In some exemplary embodiments the system may detect initiation of the stabilization period, wherein the acquiring of the tune data is performed in response to the detecting of the initiation of the stabilization period.

In some exemplary embodiments the batch of one or more analytical runs comprises a plurality of analytical runs and the one or more idle-time periods comprises an idle-time period that occurs between successive analytical runs included in the plurality of analytical runs.

In some exemplary embodiments the tune data is acquired based on a mass analysis of a known chemical compound performed with the mass spectrometer during the one or more idle-time periods.

In some exemplary embodiments the system may request user input to configure the one or more idle-time periods, and configure, in response to receipt of the user input, the one or more idle-time periods based on the user input.

In some exemplary embodiments the setting of the operating parameter to the determined value is performed in response to the determination of the value.

In some exemplary embodiments the system may request user authorization to set the operating parameter to the determined value and set, in response to receipt of the user authorization, the operating parameter to the determined value.

In some exemplary embodiments the tune data is acquired during one or more run-time periods occurring during the batch of one or more analytical runs.

In some exemplary embodiments the tune data is based on at least one of a mass analysis of an analytical sample performed with the mass spectrometer during the one or more run-time periods and a mass analysis of a known chemical compound performed with the mass spectrometer during the one or more run-time periods.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
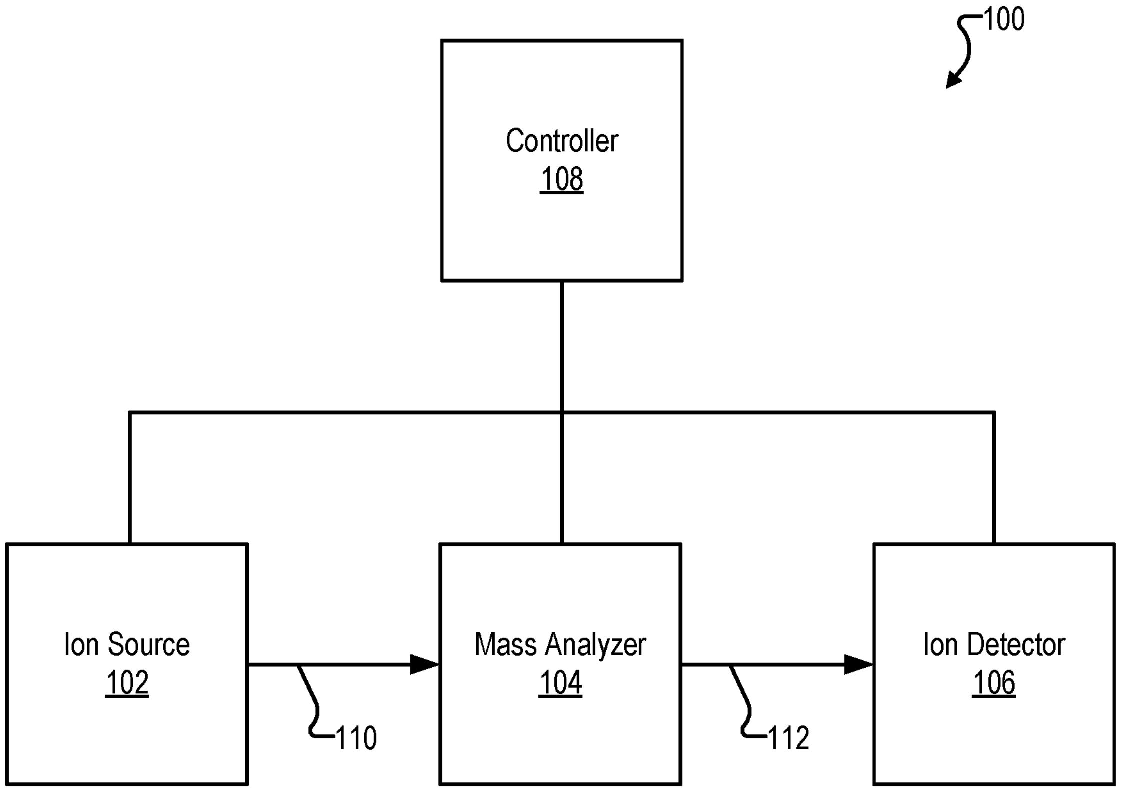
FIG. 1 illustrates an exemplary mass spectrometer according to principles described herein.

Tuning systems and methods are described herein. As will be described below in more detail, a tuning system may acquire, from a mass spectrometer during a batch of one or more analytical runs performed with the mass spectrometer, a set of tune data associated with an operating characteristic of the mass spectrometer. The tuning system may determine, based on the set of tune data, a value of an operating parameter configured to adjust the operating characteristic of the mass spectrometer and set the operating parameter to the determined value.

To illustrate, a gas chromatograph coupled with a mass spectrometer (a "GC-MS system") may be used to perform multiple analytical runs to analyze multiple different analytical samples. During a first analytical run of a first analytical sample the mass spectrometer may have a temporary idle-time period (e.g., 3 minutes), such as when the oven in the gas chromatograph is cooling down at the end of the first analytical run and prior to the next analytical run of a second sample. Since the mass spectrometer is not running an analytical sample during the idle-time period, the mass spectrometer may instead run, during the idle-time period, a calibrant sample and acquire a set of tune data, such as data representative of mass resolution (e.g., the width of calibrant peaks). Using this set of tune data, the mass spectrometer may determine a value of the radio frequency ("RF") voltage/direct current ("DC") voltage ramp rate to be applied to electrodes of the mass analyzer to thereby adjusting the mass resolution to the desired level.

As another illustration, a liquid chromatograph coupled with a mass spectrometer (an "LC-MS system") may be used to perform an analytical run of an analytical sample. A known chemical compound (e.g., an internal standard, a mass defect, a calibrant, column bleed, etc.) may be present in the effluent from the liquid chromatograph column or may injected directly to the mass spectrometer. During a run-time period of the analytical run the mass spectrometer may acquire tune data based on a mass analysis of the known chemical compound (e.g., based on the peaks of the known compound in the mass spectra). The tune data may be used to generate a detector gain curve (e.g., according to the Fies Method), and the tuning system may determine, based on the gain curve, a value of a voltage to be applied to an electron multiplier included in the detector to obtain a desired detector gain.

The systems and methods described herein may provide various benefits. For example, the systems and methods described herein may tune one or more components of a mass spectrometer (e.g., an ion source, a mass filter, optics, a detector, and any subcomponents thereof) to optimize one or more operating characteristics (e.g., mass resolution, mass accuracy, mass range, detector gain, etc.) of the mass spectrometer. Additionally, the systems and methods described herein may tune the mass spectrometer in the background during one or more batches of one or more analytical runs. Thus, the systems and methods described herein improve the tuning process without interrupting performance of analytical runs. Moreover, by acquiring tune data piecemeal during idle-time periods and/or run-time periods occurring during one or more batches of one or more analytical runs, the systems and methods described herein may complete a full autotune in the background with basically no burden to the user. These and other benefits of the systems and methods described herein will be made apparent in the description that follows. Various embodiments will now be described in more detail with reference to the figures.

FIG. 1 illustrates functional components of an exemplary mass spectrometer 100. The exemplary mass spectrometer 100 is illustrative and not limiting. As shown, mass spectrometer 100 includes an ion source 102, a mass analyzer 104, an ion detector 106, and a controller 108.

Ion source 102 is configured to produce a plurality of ions from a sample to be analyzed and to deliver the ions to mass analyzer 104. Ion source 102 may use any suitable ionization technique, including without limitation electron ionization, chemical ionization, matrix assisted laser desorption/ionization, electrospray ionization, atmospheric pressure chemical ionization, atmospheric pressure photoionization, inductively coupled plasma, and the like. Ion source 102 may include various components for producing ions from a sample and delivering the resulting ion beam 110 to mass analyzer 104.

Mass analyzer 104 is configured to separate the ions in ion beam 110 according to the mass-to-charge ratio (m/z) of each of the ions. Mass analyzer 104 may be implemented, for example, by a quadrupole mass filter, an ion trap (e.g., a three-dimensional quadrupole ion trap, a cylindrical ion trap, a linear quadrupole ion trap, a toroidal ion trap, etc.), a time-of-flight (TOF) mass analyzer, an electrostatic trap mass analyzer (e.g. Orbitrap mass analyzer, Kingdon trap, etc.), a Fourier transform ion cyclotron resonance (FT-ICR) mass analyzer, a sector mass analyzer, and the like.

In some examples, mass analyzer 104 may include one or more multipole assemblies having a plurality of rod electrodes (e.g., a quadrupole, a hexapole, an octapole, etc.) for use in guiding, trapping, and/or filtering ions. In a quadrupole, opposite phases of RF voltage may be applied to pairs of rod electrodes, thereby generating a quadrupolar electric field that guides or traps ions within a center region of the quadrupole. In quadrupole mass filters, a mass resolving direct current (DC) voltage may also be applied to the pairs of rod electrodes, thereby superimposing a DC electric field on the quadrupolar electric field and causing a trajectory of some ions to become unstable and causing the unstable ions to discharge against one of the rod electrodes. In such quadrupole mass filters, only ions having a certain mass-to-charge ratio will maintain a stable trajectory and traverse the length of the quadrupole, wherein they are emitted from the mass filter and subsequently detected by ion detector 106. In some examples mass analyzer 104 may be coupled to an oscillatory voltage power supply (not shown) configured to supply the RF voltage to the multipole assembly, and may be coupled to a DC voltage power supply configured to supply a mass resolving DC voltage to the multipole assembly.

In some embodiments that implement tandem mass spectrometers, mass analyzer 104 and/or ion source 102 may also include a collision cell. The term "collision cell," as used herein, may encompass any structure arranged to produce product ions via controlled dissociation processes and is not limited to devices employed for collisionally-activated dissociation. For example, a collision cell may be configured to fragment the ions using collision induced dissociation, electron transfer dissociation, electron capture dissociation, photo induced dissociation, surface induced dissociation, ion/molecule reactions, and the like. A collision cell may be positioned upstream from a mass filter, which separates the fragmented ions based on the mass-to-charge ratio of the ions. In some embodiments, mass analyzer 104 may include a combination of multiple mass filters and/or collision cells, such as a triple quadrupole mass analyzer, where a collision cell is interposed in the ion path between independently operable mass filters.

Ion detector 106 is configured to detect ions separated by mass analyzer 104 at each of a variety of different mass-to-charge ratios and responsively generate an electrical signal representative of ion intensity (quantity of ions) or relative abundance of the ions. The electrical signal is transmitted to controller 108 for processing, such as to construct a mass spectrum of the sample. For example, mass analyzer 104 may emit an emission beam 112 of separated ions to ion detector 106, which is configured to detect the ions in emission beam 112 and generate or provide data that can be used by controller 108 to construct a mass spectrum of the sample. Ion detector 106 may be implemented by any suitable detection device, including without limitation an electron multiplier, a Faraday cup, and the like. In some examples detector 106 has a gain that varies in response to a gain control signal sent from the controller 108.

For example, detector 106 may include a high energy conversion dynode, an electron multiplier (e.g., a discrete-dynode electron multiplier, continuous dynode electron multiplier, photomultiplier, silicon photomultiplier, avalanche diode, avalanche photodiode, etc,), and circuitry (e.g., an electrometer and associated electronic circuitry). The high energy conversion dynode may be configured to convert ions received from mass analyzer 104 into electrons or other charged particles. The electron multiplier may be configured to amplify the produced electrons through a series of dynodes at increasing voltages, which create a cascade of electrons and multiply the incoming electron current. The electron cascade may then be detected and processed by the circuitry to generate an electrical signal corresponding to the detected ion intensity. The voltage of the gain control signal serves as a multiplier voltage of the electron multiplier to control the gain of detector 106.

In some examples ion source 102 and/or mass analyzer 104 may include ion optics (e.g., an ion guide, a focusing lens, a deflector, etc.) for focusing, accelerating, and/or guiding ions (e.g., ion beam 110 and/or emission beam 112) through mass spectrometer 100. For instance, ion source 102 may include ion optics for focusing the produced ions into ion beam 110, accelerating ion beam 110, and guiding ion beam 110 toward mass analyzer 104.

Controller 108 may be communicatively coupled with, and configured to control operations of, ion source 102, mass analyzer 104, and/or ion detector 106. For example, controller 108 may be configured to control operation of various hardware components included in ion source 102, mass analyzer 104, and/or ion detector 106. To illustrate, controller 108 may be configured to control an intensity of ion beam 110 by setting an ionization voltage and accelerating voltage of ion source 102. Controller 108 may further be configured to control the oscillatory voltage power supply and/or the DC power supply to supply the RF voltage and/or the DC voltage to mass analyzer 104 (e.g., to a multipole assembly included in mass analyzer 104), and adjust values of the RF voltage and DC voltage to select an effective range of the mass-to-charge ratio of ions to detect. Controller 108 may also adjust the sensitivity of ion detector 106, such as by adjusting the detector gain.

Controller 108 may also include and/or provide a user interface configured to enable interaction between a user of mass spectrometer 100 and controller 108. The user may interact with controller 108 via the user interface by tactile, visual, auditory, and/or other sensory type communication. For example, the user interface may include a display device (e.g., liquid crystal display (LCD) display screen, a touch screen, etc.) for displaying information (e.g., mass spectra, notifications, etc.) to the user. The user interface may also include an input device (e.g., a keyboard, a mouse, a touchscreen device, etc.) that allows the user to provide input to controller 108. In other examples the display device and/or input device may be separate from, but communicatively coupled to, controller 108. For instance, the display device and the input device may be included in a computer (e.g., a desktop computer, a laptop computer, etc.) communicatively connected to controller 108 by way of a wired connection (e.g., by one or more cables) and/or a wireless connection.

Controller 108 may include hardware (e.g., a processor, circuitry, etc.) and/or software configured to control operations of the various components of mass spectrometer 100. While FIG. 1 shows that controller 108 is included in mass spectrometer 100, controller 108 may alternatively be implemented in whole or in part separately from mass spectrometer 100, such as by a computing device communicatively coupled to mass spectrometer 100 by way of a wired connection (e.g., a cable) and/or a network (e.g., a local area network, a wireless network (e.g., Wi-Fi), a wide area network, the Internet, a cellular data network, etc.).

Operation of mass spectrometer 100 will now be described. In operation, the mass spectrometer 100 conducts a mass analysis of an unknown sample. During the mass analysis, controller 108 directs ion source 102 to produce ions from an unknown sample material and deliver the ions to mass analyzer 104. Controller 108 directs mass analyzer 104 to scan across a range of mass-to-charge ratios to selectively filter the produced ions according to their mass-to-charge ratio. At any given point in time during an analytical scan, the ions provided to detector 106 have a selected mass-to-charge ratio. Mass spectrometer 100 may operate in a mode where the selected mass-to-charge ratio progressively increases (or progressively decreases) during the scan. Alternatively, however, mass spectrometer 100 may operate in a mode in which the selected mass-to-charge ratio does not progressively increase (or decrease), but is instead constant or discontinuous, such as in a selected ion monitoring (SIM) mode or a selected reaction monitoring (SRM) mode.

Detector 106 detects an ion intensity (quantity) for the ions of each mass-to-charge ratio as received from mass analyzer 104. Detector 106 generates electrical signals (ion signals) corresponding to the detected ion intensity and transmits the ion signals to controller 108, which may save the data, process the data, and generate mass spectra based on the data.

Figure 2:
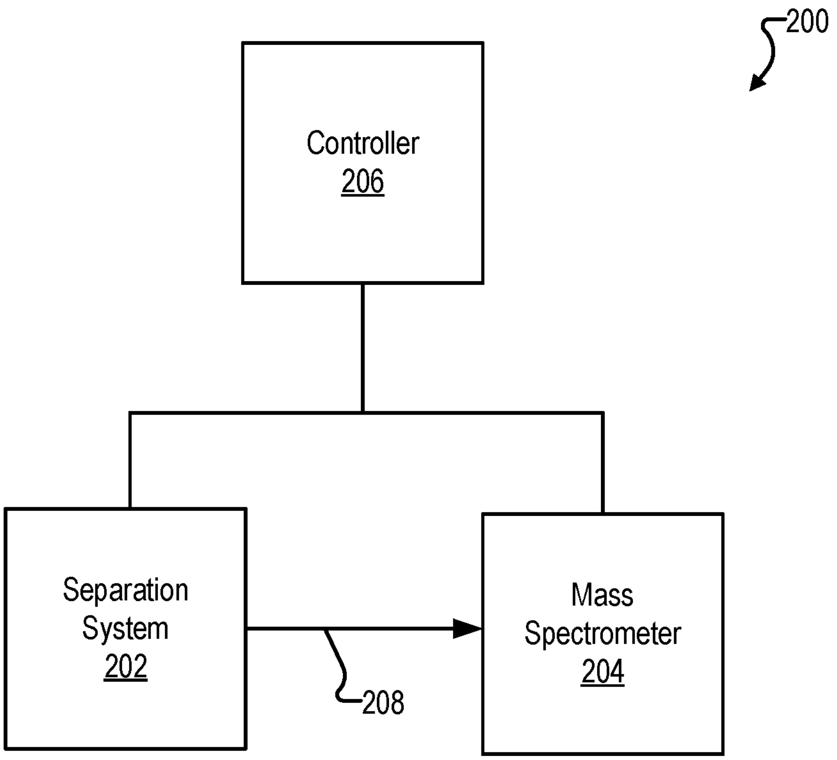
FIG. 2 illustrates an exemplary combined separation and mass spectrometry system according to principles described herein.

In some embodiments mass spectrometer 100 may be coupled with a separation system configured to separate components of a sample to be analyzed by mass spectrometer 100. FIG. 2 illustrates an exemplary combined separation and mass spectrometry system 200 ("combined system 200"). As shown, combined system 200 includes a separation system 202, a mass spectrometer 204, and a controller 206. Combined system 200 may include additional or alternative components as may suit a particular implementation.

In an analytical run performed by combined system 200 separation system 202 is configured to receive a sample to be analyzed and separate certain components within the sample. In some examples separation system 202 may also detect a relative abundance of the separated components, such as by generating a chromatogram representative of the components within the sample. Separation system 202 may be implemented by any device configured to separate components included in the sample, such as a liquid chromatograph (e.g., a high-performance liquid chromatograph), a gas chromatograph, an ion chromatograph, a capillary electrophoresis system, and the like. Components 208 separated by separation system 202 are delivered to mass spectrometer 204 for a mass analysis by mass spectrometer 204.

For example, in a liquid chromatograph a sample may be injected into a mobile phase (e.g., a solvent), which carries the sample through a column containing a stationary phase (e.g., an adsorbent packing material). As the mobile phase passes through the column, components 208 within the sample elute from the column at different times based on, for example, their size, their affinity to the stationary phase, their polarity, and/or their hydrophobicity. The retention time of components 208 may also be affected by liquid chromatograph conditions, such as mobile phase flow rate and solvent composition. A detector (e.g., a spectrophotometer) may measure the relative intensity of a signal modulated by each separated component (eluite) in the effluent from the column and represent the signal as a chromatograph. In some examples the relative intensity may be correlated to or representative of relative abundance of the separated components. Data generated by the liquid chromatograph may be output to controller 206. In some analytical runs the liquid chromatograph may ramp a solvent composition (e.g., a polarity, a pH, a concentration, etc.) over time in a gradient elution run to facilitate separation of the components of the sample.

In a gas chromatograph the mobile phase is a carrier gas (e.g., helium, hydrogen, argon, nitrogen, etc.), and the retention time of components 208 may be affected by gas chromatograph conditions such as pressure, column temperature, and carrier gas flow rate. In some analytical runs in which the components 208 have a wide range of boiling points the gas chromatograph may operate with a temperature gradient in which an oven increases the column temperature over time, thereby ensuring complete and efficient separation of early and late-eluting components.

Mass spectrometer 204 is configured to receive the separated components 208 from separation system 202, produce ions from the components 208 and separate the ions based on the mass-to-charge ratio of each of the ions, and measure the relative abundance of the separated ions, as described above. Mass spectrometer 204 may be implemented by any suitable type of mass spectrometer (e.g., mass spectrometer 100).

Controller 206 is communicatively coupled with, and configured to control operations of, combined system 200 (e.g., separation system 202 and/or mass spectrometer 204). Controller 206 may include hardware (e.g., a processor, circuitry, etc.) and/or software configured to control operations of the various components of combined system 200. While FIG. 2 shows that controller 206 is included in combined system 200, controller 206 may alternatively be implemented in whole or in part separately from combined system 200, such as by a computing device communicatively coupled to combined system 200 by way of a wired connection (e.g., a cable) and/or a network (e.g., a local area network, a wireless network (e.g., Wi-Fi), a wide area network, the Internet, a cellular data network, etc.). In examples where mass spectrometer 204 is implemented by mass spectrometer 100, controller 206 may be implemented in whole or in part by controller 108.

As mentioned, a mass spectrometer (e.g., mass spectrometer 100 and/or mass spectrometer 204) may be tuned to optimize one or more operating characteristics (e.g., mass resolution, mass accuracy, detector gain, intensity, etc.) of the mass spectrometer. As used herein, the term "optimal" and its variants refers to any value that is determined to be numerically better than one or more other values. For example, an optimal or optimized value is not necessarily the best possible value, but may simply satisfy a criterion (e.g. a change in an operating characteristic from a previous value is within tolerance). Thus, an optimized operating characteristic may not be at the very best possible operating condition, but simply an operating condition that is better than another condition, e.g., as determined by a tuning criterion. Operating characteristics of a mass spectrometer, and tuning systems and methods for optimizing operating characteristics, will be described below in more detail. Generally, a tuning process performed on the mass spectrometer may ensure that the mass spectrometer generates accurate and consistent data when running analytical samples. For example, the tuning process may ensure that the mass resolution (e.g., peak width) and detected ion intensities across a range of masses are at appropriate levels relative to each other when analyzing an unknown material. The tuning process may also ensure that the mass spectrometer accurately assigns masses to the ions produced when analyzing an unknown material. Exemplary tunes will be described in more detail below.

Figure 3:
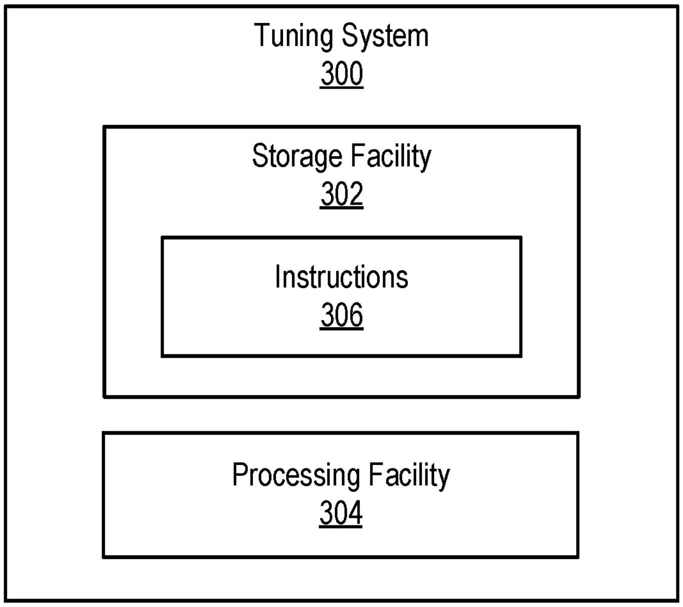
FIG. 3 illustrates an exemplary tuning system according to principles described herein.

FIG. 3 illustrates an exemplary tuning system 300 configured to tune a mass spectrometer (e.g., mass spectrometer 100 and/or mass spectrometer 204). As shown, tuning system 300 may include, without limitation, a storage facility 302 and a processing facility 304 selectively and communicatively coupled to one another. Tuning system 300 (e.g., facilities 302 and 304) may include or be implemented by hardware and/or software components (e.g., processors, memories, communication interfaces, instructions stored in memory for execution by the processors, etc.). In some examples, facilities 302 and 304 may be distributed between multiple devices and/or multiple locations as may serve a particular implementation.

Storage facility 302 may maintain (e.g., store) executable data used by processing facility 304 to perform any of the operations described herein. For example, storage facility 302 may store instructions 306 that may be executed by processing facility 304 to perform any of the operations described herein. Instructions 306 may be implemented by any suitable application, software, code, and/or other executable data instance. Storage facility 302 may also maintain any data received, generated, managed, used, and/or transmitted by processing facility 304. For example, storage facility 302 may maintain tune data and tuning algorithm data. Tuning algorithm data may include data representative of, used by, or associated with one or more algorithms maintained by processing facility 304 for tuning a mass spectrometer based on tune data. Tune data will be described below in more detail.

Processing facility 304 may be configured to perform (e.g., execute instructions 306 stored in storage facility 302 to perform) various processing operations associated with tuning a mass spectrometer. For example, processing facility 304 may acquire, from the mass spectrometer during a batch of one or more analytical runs performed with the mass spectrometer, a set of tune data associated with an operating characteristic of the mass spectrometer. Processing facility 304 may determine, based on the set of tune data, a value of an operating parameter configured to adjust the operating characteristic of the mass spectrometer and set the operating parameter to the determined value. These and other operations that may be performed by processing facility 304 are described herein. In the description that follows, any references to operations performed by tuning system 300 may be understood to be performed by processing facility 304 of tuning system 300.

In some examples, turning system 300 may be implemented entirely or in part by mass spectrometer 100 (e.g., by controller 108) or by combined system 200 (e.g., by controller 206). Alternatively, tuning system 300 may be implemented in whole or in part separately from mass spectrometer 100 or combined system 200, such as by a remote computing device communicatively coupled to mass spectrometer 100 by way of a wired connection (e.g., a cable) and/or a network (e.g., a local area network, a wireless network (e.g., Wi-Fi), a wide area network, the Internet, a cellular data network, etc.).

As mentioned, tuning system 300 may acquire, from a mass spectrometer during a batch of one or more analytical runs performed with the mass spectrometer, a set of tune data associated with an operating characteristic of the mass spectrometer. As used herein, an operating characteristic may refer to any characteristic exhibited by the mass spectrometer, or any of its components, during operation (e.g., during one or more analytical runs in which the mass spectrometer produces ions from a sample, separates the ions according to their mass-to-charge ratio, detects the separated ions, and produces data for generation of a mass spectrum of the detected ions). Operating characteristics may include, for example, mass resolution (peak width), mass accuracy (peak position), intensity, sensitivity, detector gain, mass range, scan speed, ion beam intensity, and the like.

As used herein an operating parameter refers to a variable condition or setting of, or applied to, a particular component or subcomponent (e.g., a hardware component) of the mass spectrometer. For example, operating parameters may include an emission current applied to an ion source filament, a lens voltage applied to an ion source focusing lens, a duty cycle for an ion source electron gate, an RF voltage amplitude applied to a mass filter, an RF voltage frequency applied to a mass filter, a DC mass resolving voltage applied to a mass filter, an RF/DC voltage ramp rate applied to a mass filter, an RF frequency applied to an ion guide, a multiplier voltage applied to an electron multiplier in a detector, and the like. Adjustment of a value of any one or more operating parameters typically results in an adjustment of one or more operating characteristics of the mass spectrometer.

As used herein, tune data may refer to any data produced, generated, collected, or otherwise obtained by the mass spectrometer during or as a result of one or more analytical runs. For instance, tune data may include data representative of values of operating parameters (e.g., RF voltage frequency, RF voltage amplitude, DC voltage, RF/DC ramp rate, scan speed, etc.), data based on the ion signal generated from a mass analysis (e.g., mass spectra, peak width, peak intensity, peak position, detector gain, etc.), and any data or information derived from the foregoing. Tuning system 300 may acquire tune data by performing one or more analytical scans of a sample (e.g., a calibrant sample, an analytical sample, etc.) and acquiring the corresponding tune data. In some examples tuning system 300 may acquire tune data by varying values of one or more operating parameters during the analytical scans. The tune data may thus associate the acquired ion signal with the value of the operating parameter(s) at the time the ion signal was generated.

Figure 4:
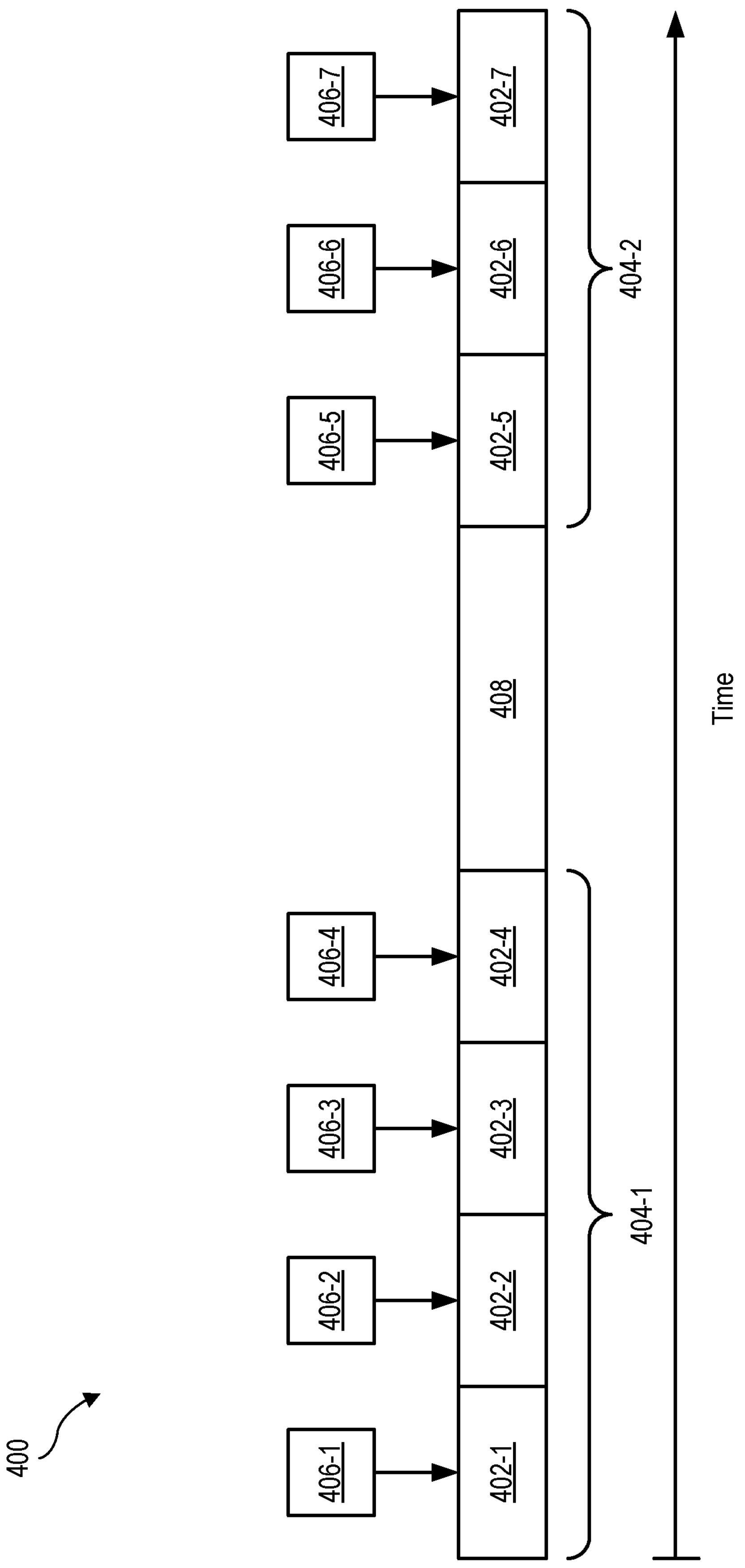
FIG. 4 illustrates a timing diagram of an exemplary workflow of a combined separation and mass spectrometry system according to principles described herein.

Tuning system 300 may be configured to acquire tune data during a batch of one or more analytical runs in accordance with an idle-time tuning process and/or a run-time tuning process. FIG. 4 illustrates a timing diagram of an exemplary workflow 400 of a combined system (e.g., a mass spectrometer coupled with a separation system, such as combined system 200) during which an idle-time tuning process and/or a run-time tuning process may be performed to tune the mass spectrometer. As shown, workflow 400 includes analytical runs 402 (e.g., analytical runs 402-1 through 402-7) performed in batches 404 (e.g., first batch 404-1 and second batch 404-2). Each batch 404 includes a distinct set of analytical runs 402 performed in succession. For instance, first batch 404-1 includes analytical runs 402-1 through 402-4 and second batch 404-2 includes analytical runs 402-5 through 402-7. It will be recognized that a batch 404 may include any number of analytical runs as may suit a particular implementation. In each analytical run 402 the combined system processes a distinct analytical sample 406 (e.g., one of analytical samples 406-1 through 406-7) by injecting the analytical sample 406 into the separation system and running the analytical sample 406 through the separation system and the mass spectrometer, as will be explained below in more detail.

A batch 404 is a set of all analytical runs 402 that are scheduled to automatically run in succession. For example, a user may load a plurality of containers (e.g., tubes, vials, vessels, etc.) containing analytical samples 406-1 through 406-4 into a tray of an autosampler of the combined system and program the combined system to automatically process analytical samples 406-1 through 406-4. Thus, in first batch 404-1 the combined system may be configured to automatically begin analytical run 402-1, automatically begin analytical run 402-2 upon completion of analytical run 402-1, automatically begin analytical run 402-3 upon completion of analytical run 402-2, and automatically begin analytical run 402-4 upon completion of analytical run 402-3. In alternative examples the combined system may require user input (e.g., by pressing a button) before commencing a batch or the next scheduled analytical run.

After completion of first batch 404-1 (e.g., after completing analytical runs 402-1 through 402-4), the combined system may enter into a standby state 408 during which no scheduled analytical runs are performed by the combined system. Standby state 408 may occur, for example, at night after all analytical runs 402 for the day have been completed. Standby state 408 may last for any period of time as may suit a particular implementation. Standby state 408 ends when the next batch (e.g., second batch 404-2) begins.

In some examples the user may specify a time period when each batch 404 is to begin. For instance, the user may program the combined system to begin first batch 404-1 at 10:00 AM and begin second batch 404-2 at 11:00 AM. Accordingly, standby state 408 may occur between first batch 404-1 and second batch 404-2 even though second batch 404-2 has been scheduled in advance.

Figure 5:
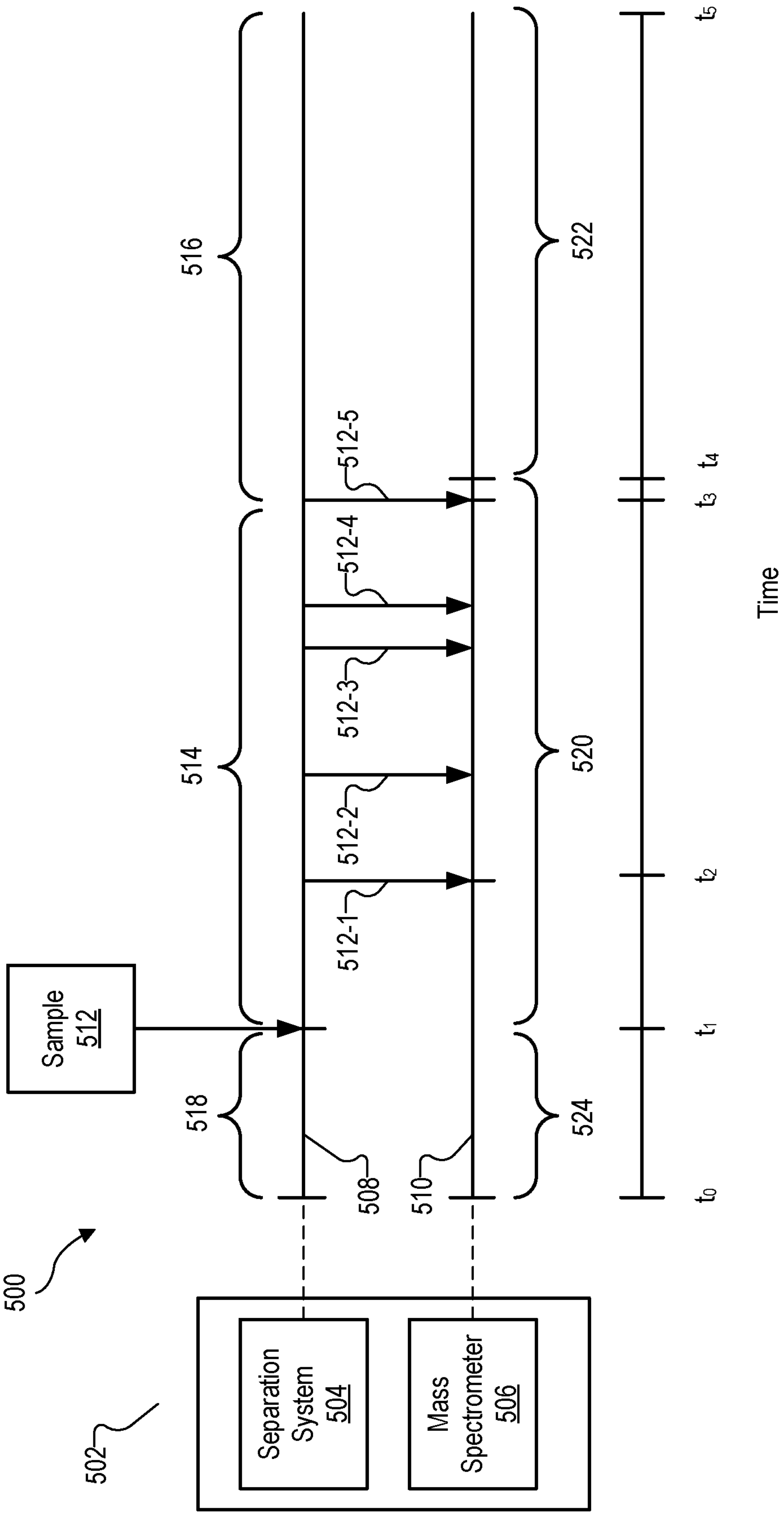
FIG. 5 illustrates a timing diagram of an exemplary analytical run performed with a combined separation and mass spectrometry system according to principles described herein.

Each analytical run 402 includes a run-time period and one or more idle-time periods during which a run-time tuning process and/or an idle-time tuning process may be performed. FIG. 5 illustrates a timing diagram of an exemplary analytical run 500 performed with a combined system 502. As shown, combined system 502 includes a separation system 504 and a mass spectrometer 506 coupled with separation system 504. In some examples combined system 502 is implemented by combined system 200. Combined system 502 may be, for example, an LC-MS system or a GC-MS system. FIG. 5 shows a timeline 508 of operations associated with separation system 504 and a timeline 510 of operations associated with mass spectrometer 506.

At time $t_1$ an analytical sample 512 is injected into a mobile phase (e.g., a solvent, a carrier gas, etc.) of separation system 504, and the mobile phase carries sample 512 through a column containing the stationary phase. As the mobile phase passes through the column, a plurality of eluites (e.g., components 512-1 through 512-5 within sample 512) elute from the column at different times and are delivered to mass spectrometer 506. For example, at time $t_2$ a first component 512-1 elutes from separation system 504 and is delivered into mass spectrometer 506. Components 512-2 through 512-5 elute from the column and are delivered into mass spectrometer 506 in succession. The last component (fifth component 512-5) elutes from the column and is delivered into mass spectrometer 506 at time t3. The time period commencing from injection of sample 512 to the elution and delivery of the last component into mass spectrometer 506 (i.e., the time period from time $t_1$ to time t3) comprises run-time period 514. In some examples run-time period 514 may begin prior to injection of sample 512. For example, the mobile phase may begin moving through separation system 504 prior to injection of sample 512. Thus, run-time period 514 may begin when the mobile phase begins moving.

After run-time period 514 ends, separation system 504 enters a stabilization period 516 during which separation system 504 resets or adjusts operating conditions in preparation for the next analytical run in the batch. For example, if separation system 504 is implemented by a liquid chromatograph, the liquid chromatograph may ramp a solvent composition (e.g., a polarity, a pH, and/or a concentration of the solvent) over time during run-time period 514 in a gradient elution run to facilitate separation of components 512-1 through 512-5. During stabilization period 516 the liquid chromatograph may flush the lines and return the solvent composition to the original conditions (e.g., the conditions existing at time $t_1$). This process may take several minutes to complete. As another example, if separation system 504 is implemented by a gas chromatograph, the gas chromatograph may ramp the oven temperature over time during run-time period 514 in a temperature gradient run. During stabilization period 516 the gas chromatograph may reset the oven temperature and allow the oven to cool to the original temperature (e.g., the temperature at time $t_1$). Again, this process may take several minutes to complete (e.g., from 3 to 10 minutes).

As shown in FIG. 5, stabilization period 516 continues until time $t_5$, at which point the operating conditions of separation system 504 (e.g., the solvent composition, the oven temperature, etc.) reach a target level, when a pre-processing period begins for the next analytical run, or when another sample is injected into separation system 504 for the next analytical run. When analytical run 500 is the last analytical run in a batch (e.g., analytical run 402-4 in batch 404-1), the end of stabilization period 516 may mark the end of the batch (e.g., batch 404-1).

In some examples, as shown in FIG. 5, a pre-processing period 518 may occur prior to run-time period 514. During pre-processing period 518 separation system 504 (or another component of combined system 502) may perform one or more operations in preparation for processing of sample 512 by separation system 504. For example, at time to an autosampler included in combined system 502 may remove a container holding sample 512, scan a barcode or other label on the container to identify and record information associated with sample 512, and aspirate sample 512 from the container. As another example, separation system 504 may inject a standard (e.g., an internal standard, a calibration standard, a tuning standard, etc.) into the mobile phase during pre-processing period 518. As a further example, a syringe in the autosampler may be washed prior to aspirating sample 512 from the container. As yet another example, separation system 504 may initialize the solvent composition, initialize the oven temperature, and the like.

In some examples only the first analytical run in a batch (e.g., analytical run 402-1 in batch 404-1 and analytical run 402-5 in batch 404-2) includes pre-processing period 518. All other analytical runs (e.g., analytical runs 402-2 through 402-4 in batch 404-1 and analytical runs 402-6 and 402-7 in batch 404-2) may perform pre-processing operations during the corresponding stabilization periods 516.

While the mobile phase and sample 512 move through separation system 504, mass spectrometer 506 receives and performs a mass analysis on the effluent from separation system 504. For example, at or prior to injection of sample 512 at time $t_1$ mass spectrometer 506 may begin monitoring the effluent from separation system 504 as the mobile phase moves sample 512 through the column. At time $t_2$ first component 512-1 is present in the effluent and delivered to mass spectrometer, which produces ions from components 512-1 through 512-5. As components 512-1 through 512-5 appear in the effluent, mass spectra generated by mass spectrometer 506 may include peaks corresponding to ions produced from components 512-1 through 512-5. At time $t_4$ mass spectrometer 506 may finish analyzing components 512-1 through 512-5. The time period commencing from injection of sample 512 into separation system 504 at time $t_1$ to completion of the mass analysis of sample 512 (e.g., sample components 512-1 through 512-5) at time $t_4$ may be referred to as run-time period 520. In examples where run-time period 514 begins prior to injection of sample 512 to initiate movement of the mobile phase, run-time period 520 may similarly begin prior to injection of sample 512 (e.g., corresponding to run-time period 514).

Run-time period 520 continues until time $t_4$, at which time mass spectrometer 506 does not process or perform any further mass analysis of sample 512. Accordingly, the period of time after run-time period 520 may be referred to as idle-time period 522. Idle-time period 522 may last until stabilization period 516 of separation system 504 ends (e.g., at time $t_5$).

In some examples where operation of separation system 504 includes a pre-processing time period 518, operation of mass spectrometer 506 may include another idle-time period 524 before run-time period 520. As shown, idle-time period 524 may substantially coincide with pre-processing period 518. Idle-time period 524 may end, and run-time period 520 may begin, when sample 512 is injected into the mobile phase at time $t_1$ and/or when the mobile phase begins moving.

In other examples the end of idle-time period 524 and the start of run-time period 520 may coincide with elution of the first component (e.g., first component 512-1 at time $t_1$). For example, idle-time period 524 may extend from time $t_0$ to time $t_2$, and run-time period 520 may begin from elution of first component 512-1 at time $t_1$. The transition from idle-time period 524 to run-time period 520 may be detected, for example, based on detection of elution of first component 512-1 in the detection signal (e.g., a chromatograph) generated by separation system 504.

In some examples a duration of idle-time period 522 and/or idle-time period 524 may be extended in order to provide additional time for an idle-time tuning process. For example, idle-time periods 522 and/or 524 may be extended by a fixed amount (e.g., by 15 seconds). Alternatively, idle-time periods 522 and/or 524 may be extended as necessary to complete an idle-time tuning process. For instance, tuning system 300 may determine that, at or near the end of idle-time period 522, acquisition of tune data may be completed within an extra 6 seconds. Accordingly, tuning system 300 may extend idle-time period 522 by 6 or more seconds. In some examples tuning system 300 may allow a user to configure extension of idle-time periods 522 and 524, such as enabling or disabling idle-time period extensions, specifying the manner of extending idle-time periods, and/or specifying the amount of idle-time period extensions.

Figure 6:
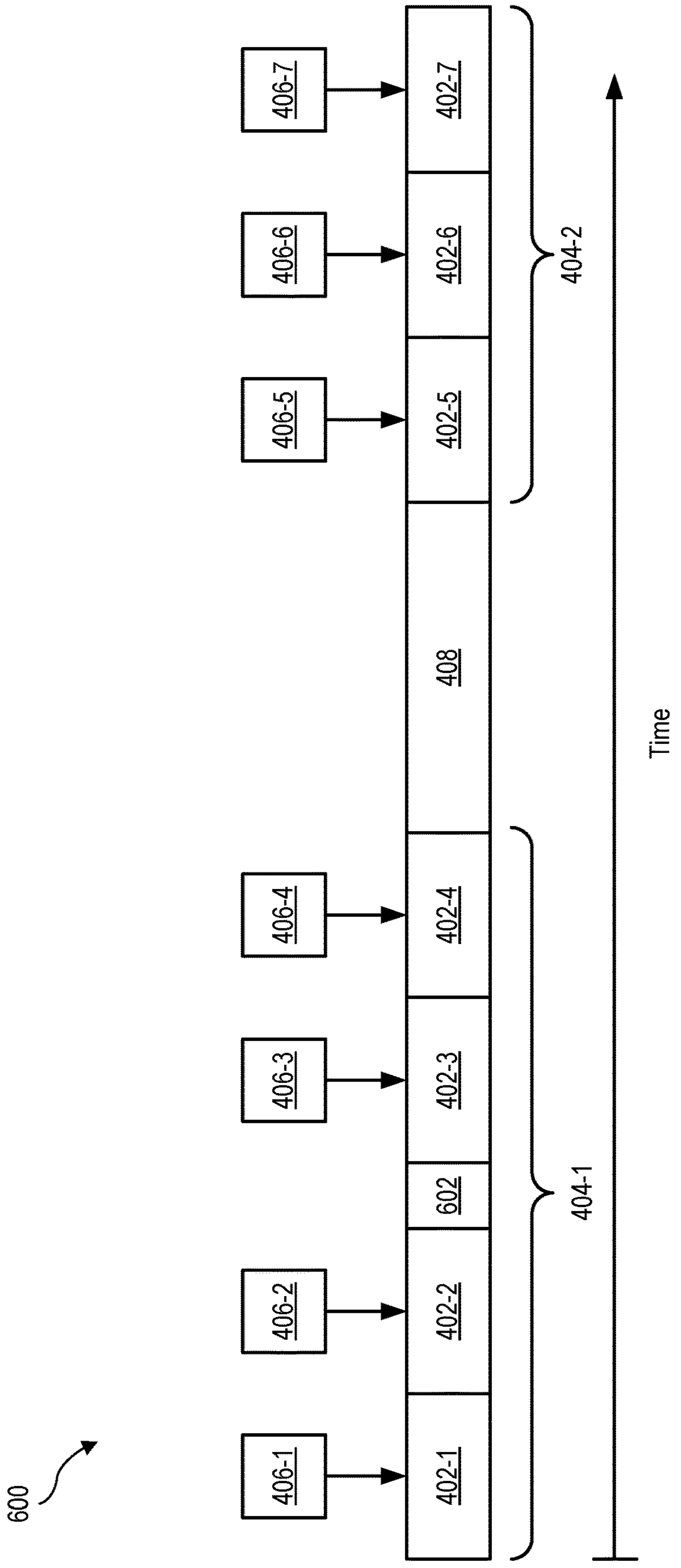
FIG. 6 illustrates a timing diagram of another exemplary workflow of a combined separation and mass spectrometry system according to principles described herein.

Additionally or alternatively to extending the duration of idle-time periods, tuning system 300 may artificially insert one or more additional idle-time periods into a batch of one or more analytical runs to provide additional time for tuning system 300 to perform the idle-time tuning process. FIG. 6 illustrates a timing diagram of another exemplary workflow 600 of a combined system. FIG. 6 is similar to FIG. 4 except that tuning system 300 has inserted an additional idle-time period 602 between analytical run 402-2 and analytical run 402-3 in batch 404-1. Additional idle-time period 602 may have any duration as may suit a particular implementation (e.g., 30 seconds). While FIG. 6 shows only one additional idle-time period 602, workflow 600 may include any number of additional idle-time periods during batch 404-1 and/or batch 404-2 as may suit a particular implementation.

In some examples tuning system 300 may be configured to allow a user to configure additional idle-time periods. For example, tuning system 300 may allow a user to select one or more menu options to manually insert an idle-time period, specify a timing of idle-time periods (e.g., between processing of samples 406-2 and 406-3, at 3:00 PM, etc.), specify a duration of the idle-time periods, specify particular tune to be performed during the idle-time periods, and the like. In some examples tuning system 300 may automatically insert additional idle-time period 602 and negotiate with the user the configuration of additional idle-time period 602.

As mentioned above, tuning system 300 is configured to acquire tune data during a batch of one or more analytical runs in accordance with an idle-time tuning process and/or a run-time tuning process and use the acquired tune data to determine a value of one or more operating parameters. Idle-time and run-time tuning processes will now be described.

Figure 7:
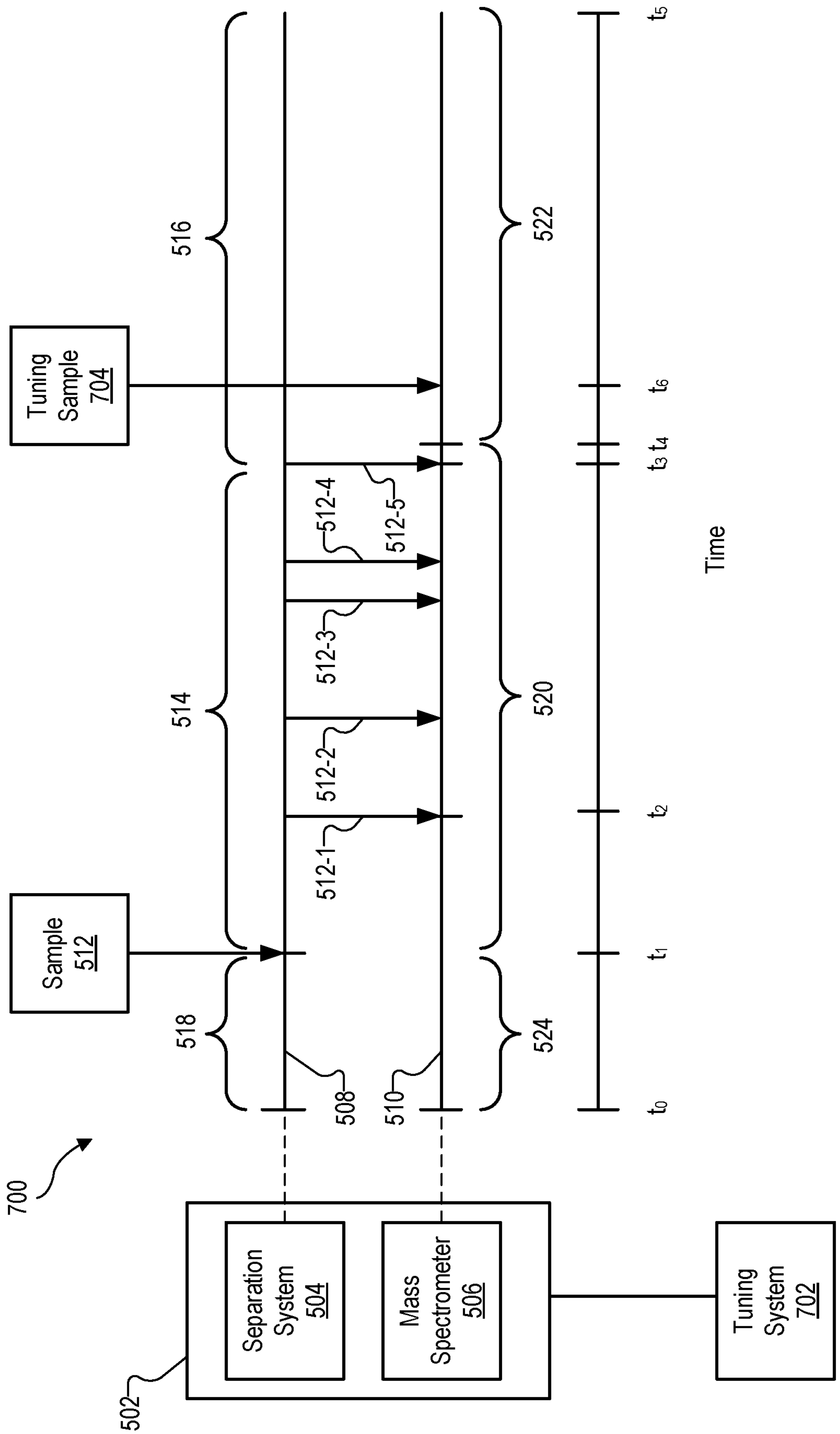
FIG. 7 illustrates a timing diagram of an exemplary analytical run during which an idle-time tuning process is performed according to principles described herein.

In an idle-time tuning process, tuning system 300 is configured to acquire tune data during one or more idle-time periods occurring during a batch of one or more analytical runs. FIG. 7 illustrates a timing diagram of an exemplary analytical run 700 during which an idle-time tuning process may be performed. FIG. 7 is the same as FIG. 5 except that a tuning system 702 is communicatively coupled with combined system 502 and a tuning sample 704 is injected into mass spectrometer 506 during idle-time period 522. Tuning system 702 may be implemented by tuning system 300. While tuning system 702 is shown to be separate from combined system 502, in alternative examples tuning system 702 may be included in combined system 502 (e.g., may be implemented by one or more controllers included in combined system 502).

In an idle-time tuning process tune data may be based on a mass analysis of a tuning sample 704. To this end, tuning system 702 may direct combined system 502 to inject tuning sample 704 into mass spectrometer 506 during idle-time period 522 (e.g., at time $t_6$) and perform one or more analytical scans of tuning sample 704 during idle-time period 522. Tuning sample 704 may be any sample (e.g., a calibrant sample, an internal standard, etc.) containing a known compound, such as perfluorotributylamine (also referred to as "PFTBA" or "FC-43"), decafluorotriphenyl phosphine (also referred to as "DFTPP"), and the like. While FIG. 7 shows that tuning sample 704 is injected into mass spectrometer 506 at time $t_6$, tuning sample 704 may be injected into mass spectrometer 506 at any other time during idle-time period 522 and/or idle-time period 524 as may suit a particular implementation (e.g., after stabilization of a helium flow rate during cooling of an oven in a GC-MS system).

In some examples tuning system 702 may be configured to detect completion of run-time period 520 and/or the start of idle-time period 522 (or the start of idle-time period 524) and, in response, direct combined system 502 to inject tuning sample 704 into mass spectrometer 506. Tuning system 702 may detect completion of run-time period 520 and/or the start of idle-time period 522 (or idle-time period 424) in any suitable way. For example, tuning system 702 may detect a change in the ion signal (or mass spectra) generated by mass spectrometer indicating that components 512-1 through 512-5 are no longer detected. Additionally or alternatively, tuning system 702 may detect (e.g., based on data acquired from separation system 504) initiation and/or performance of a stabilization process performed by separation system 504, such as cooling of a GC oven, stabilization of a helium flow rate, or resetting an LC solvent composition.

During idle-time period 522 tuning system 702 may acquire a set of tune data to be used in determining a value of one or more operating parameters of mass spectrometer 506. For example, during idle-time period 522 tuning system 702 may acquire, from mass spectrometer 506, the ion signals generated based on the mass analysis of tuning sample 704 and data representative of a value of an RF voltage amplitude applied, during idle-time period 522, to a mass filter included in mass spectrometer 506. Acquisition of the set of tune data may continue until idle-time period 522 ends or until tuning system 702 determines that sufficient tune data has been acquired.

The acquired set of tune data may be used by tuning system 702 to determine a value of one or more operating parameters. For example, based on the acquired ion signals and the RF voltage amplitude applied to the mass filter, tuning system 702 may determine an RF voltage amplitude to be applied to the electrodes of the mass filter to optimize the mass calibration. Tuning system 702 may determine the value of the operating parameter in any suitable way. For example, tuning system 702 may apply a tuning algorithm configured to determine an optimal value of the operating parameter based on the acquired tune data and based on a set of tuning criteria (e.g., tuning criteria set forth in an established method, such as EPA Method 8270). Any suitable tuning algorithm may be used as may suit a particular implementation.

In some examples tuning system 300 may also be configured to acquire tune data while in a standby state (e.g., standby state 408) in addition to during one or more idle-time periods.

As mentioned above, tuning system 300 may also be configured to acquire tune data during a batch of one or more analytical runs in accordance with a run-time tuning process. Tuning system 300 may also use the tune data acquired during the run-time tuning process to determine a value of one or more operating parameters. In a run-time tuning process tuning system 300 is configured to acquire tune data during one or more run-time periods occurring during a batch of one or more analytical runs. A run-time tuning process may be performed passively and/or actively.

In passive run-time tuning, tuning system 300 may acquire and use, as tune data, any data produced or generated by the mass spectrometer in the ordinary course of one or more analytical runs. Thus, passive run-time tuning may be performed without the use of a tuning sample (e.g., a calibrant sample). For example, the passively-acquired tune data may be based on (e.g., generated or derived from) the ion signals generated from analytical scans performed during a mass analysis of an analyte of interest (e.g., an analytical sample). Additionally or alternatively, the passively-acquired tune data may be based on the mobile phase and/or any background components that are present in the mobile phase. These different types and sources of tune data will now be described with reference to FIG. 7.

As shown in FIG. 7, mass spectrometer 506 receives the effluent from separation system 504 and performs a mass analysis on the effluent during run-time period 520. Prior to the emergence of first component 512-1 from separation system 504 at time $t_2$, the effluent generally includes only the mobile phase (e.g., the solvent in LC-MS systems or the carrier gas in GC-MS systems). In some instances the effluent from separation system 504 may also include known background components, such as an internal standard, column bleed, trace amounts of silicone transferred from an autosampler syringe (e.g., silicone picked up by the syringe when the syringe pierces the septum on a vial holding sample 512), etc. Accordingly, the ion signals generated by mass spectrometer 506 may represent the known mobile phase and any known background components present with the mobile phase. Accordingly, tuning system 702 may use the ion signals generated based on the components of the mobile phase (e.g., ion signals generated before time $t_2$) as tune data. Such tune data may represent or be used to determine, for example, operating characteristics such as mass resolution (peak width), intensity, and mass accuracy (mass position).

Beginning at time $t_2$ the effluent may also include, in succession, components 512-1 through 512-5 from the analyte of interest (e.g., sample 512). As a result, ion signals generated by mass spectrometer 506 after time $t_2$ may also represent, in addition to the known components of the mobile phase, ions produced from components 512-1 through 512-5. Accordingly, tuning system 702 may use ion signals generated based on the analyte of interest (e.g., ion signals generated after time $t_2$) as tune data. Such tune data may also represent or be used to determine, for example, operating characteristics such as mass resolution (peak width), intensity, and mass accuracy (mass position).

In addition to ion signals (or mass spectra), tuning system 702 may also acquire, as tune data, data representative of values of operating parameters of one or more components or subcomponents of mass spectrometer 506 during run-time period 520.

In some examples tuning system 702 may be configured to use the acquired tune data to determine a value of one or more operating parameters. For example, tuning system 702 may be configured to determine a value of an operating parameter (e.g., RF/DC voltage ramp rate, RF voltage amplitude, etc.) configured to adjust the mass resolution and/or mass accuracy. Tuning system 702 may determine the value of one or more operating parameters based on the acquired tune data in any suitable way. For example, tuning system 702 may apply a tuning algorithm configured to determine an optimal value of the operating parameter based on the acquired tune data and based on a set of tuning criteria. Any suitable tuning algorithm may be used as may suit a particular implementation.

Figure 8:
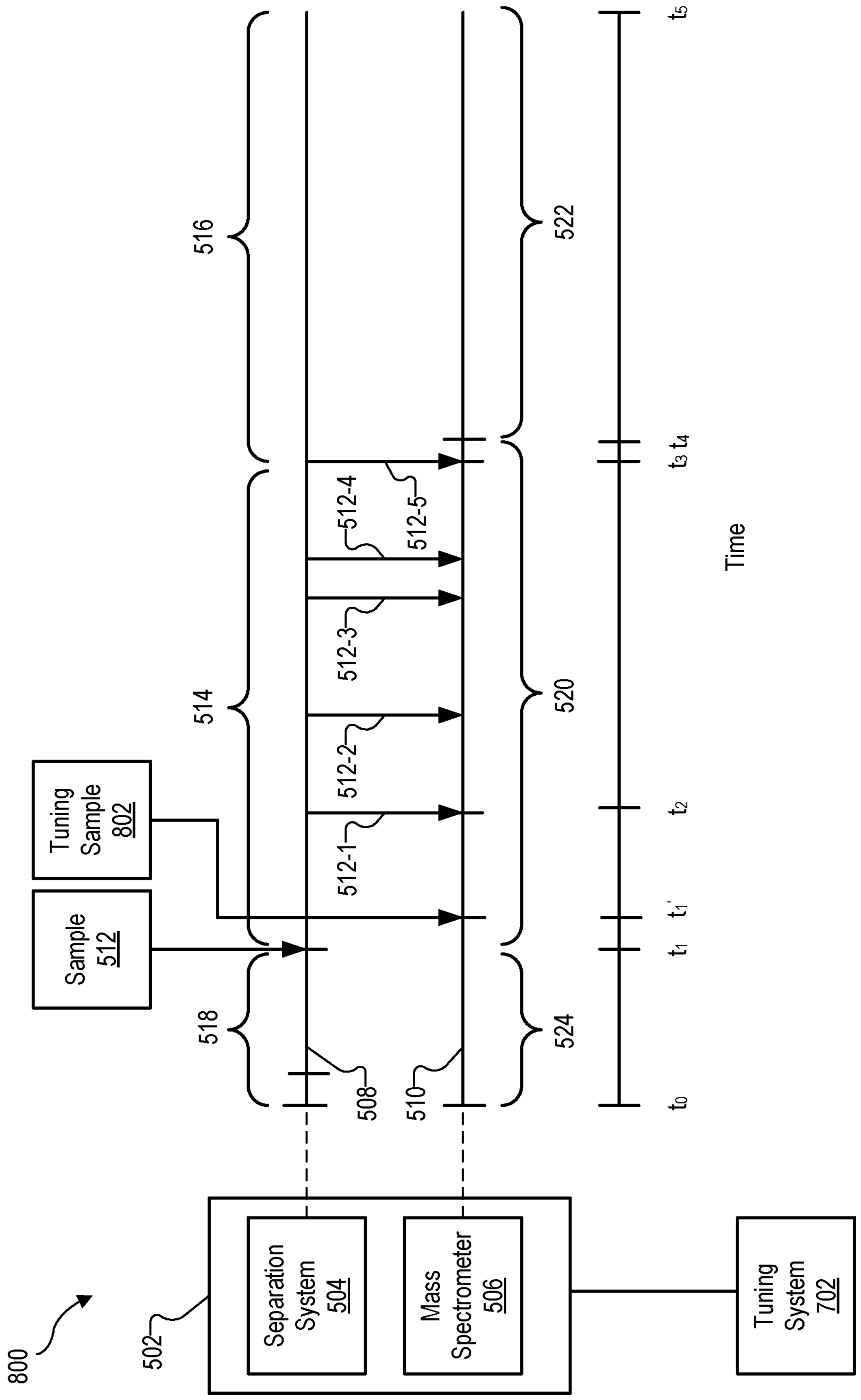
FIG. 8 illustrates a timing diagram of an exemplary analytical run during which an active run-time tuning process is performed according to principles described herein.

In active run-time tuning, tune data may be generated based on a known component (e.g., a tuning sample, a calibrant sample, etc.) that is injected into the combined system for analysis by the mass spectrometer during the ordinary course of an analytical run. FIG. 8 illustrates a timing diagram of an exemplary analytical run 800 during which an active run-time tuning process is performed. FIG. 8 is the same as FIG. 7 except that a tuning sample 802 is injected into mass spectrometer 506 for analysis during run-time period 520. Tuning sample 802 may be any sample (e.g., a calibrant sample, an internal standard, a lock mass, etc.) containing a known compound. In some examples tuning sample 802 is selected such that it does not interfere with sample 512 or otherwise affect the mass analysis of sample 512 by mass spectrometer 506.

As shown in FIG. 8, tuning sample 802 is injected directly into mass spectrometer 506 during run-time period 520 when there are no analytes of interest being analyzed by mass spectrometer 506. For example, from time $t_1$ to time $t_2$ first component 512-1 has not yet reached mass spectrometer 506. Accordingly, tuning system 702 may direct combined system 502 to inject tuning sample 802 into mass spectrometer 506 at time $t_1'$ and analyze tuning sample 802 during this initial portion of run-time period 520. Although time $t_1'$ is shown to occur after time $t_1$ (i.e., after sample 512 is injected into the mobile phase), time $t_1'$ may occur at the same time or prior to time $t_1$. In some examples the injection of tuning sample 802 and/or the mass analysis of tuning sample 802 continues until tuning system 702 detects the emergence of first component 512-1 from the column (e.g., by way of a chromatogram generated by separation system 504). In alternative examples, the injection of tuning sample 802 and/or the mass analysis of tuning sample 802 may be for only a limited duration as may suit a particular implementation.

In some examples in which tuning sample 802 does not interfere with or otherwise affect the mass analysis of sample 512 (or components 512-1 through 512-5), tuning sample 802 may be injected into mass spectrometer 506 and analyzed at any time during run-time period 520, including during analysis of components 512-1 through 512-5 (e.g., after time $t_2$).

As shown in FIG. 8 tuning sample 802 is injected directly into mass spectrometer 506. In alternative examples tuning sample 802 may be injected into the mobile phase of separation system 504 at any suitable location (e.g., upstream from the column or into the effluent downstream from the column) and at any suitable time.

During run-time period 520 mass spectrometer 506 may generate ion signals based on ions produced from the components of the effluent from separation system 504 and ions produced from tuning sample 802. Tuning system 702 may acquire, as tune data, the ion signals and any data representative of values of operating parameters of one or more components or subcomponents of mass spectrometer 506 during run-time period 520. Tuning system 702 may use this tune data to measure one or more operating characteristics of mass spectrometer 506 (e.g., mass resolution, mass accuracy, etc.) and/or determine a value of an operating parameter configured to adjust the measured operating characteristic.

In the foregoing description passive run-time tuning and active run-time tuning have been described as separate processes. However, a run-time tuning process may include both passive run-time tuning and active run-time tuning during the same analytical run and/or batch of analytical runs.

Referring again to FIG. 3 and as mentioned above, tuning system 300 may be configured to determine a value of an operating parameter based on a set of tune data acquired during a batch of one or more analytical runs and set the operating parameter to the determined value. By setting the operating parameter to the determined value tuning system 300 may adjust an operating characteristic of the mass spectrometer. Tuning system 300 may set the operating parameter to the determined value in any suitable way. For instance, tuning system 300 may control an oscillatory voltage power supply to set the value of an amplitude and/or a frequency of an RF voltage to the determined value, control a DC voltage power supply to set the value of a DC voltage to the determined level, etc.

In some examples tuning system 300 is configured to automatically set the operating parameter to the determined value in real-time. For example, tuning system 300 may set the operating parameter to the determined value in response to determination of the value of the operating parameter. In this way tuning system 300 may tune the mass spectrometer quickly while in normal operation.

In other examples tuning system 300 may be configured to automatically set an operating parameter to the determined value in response to completion of a partial tune, such as a detector tune, a mass accuracy tune, a mass resolution tune, or a lens tune. For example, a partial tune may involve setting a value of multiple operating parameters (e.g., an RF voltage amplitude, an RF voltage frequency, and an RF/DC voltage ramp rate). Accordingly, tuning system 300 may set the values of the operating parameters only after tuning system 300 has determined a value of all operating parameters associated with the partial tune.

In yet other examples tuning system 300 may be configured to automatically set an operating parameter to the determined value in response to completion of a full tune (e.g., a complete autotune). That is, tuning system 300 may set the values of the operating parameters only after tuning system 300 has determined a value of all operating parameters associated with the full tune.

In the examples described above tuning system 300 is configured to set the operating parameter automatically without user input. Alternatively, tuning system 300 may be configured to set the operating parameter(s) only after tuning system 300 has received user authorization. In some examples tuning system 300 may be configured to request and receive user authorization in real-time. For instance, in response to determining a value of an operating parameter (or values of all operating parameters included in a partial tune or a full tune), tuning system 300 may present a notification to the user and request user authorization to set the value(s) of the operating parameter(s). The notification may specify which operating parameter(s) is/are to be adjusted, the extent of the adjustment of the operating parameter(s) (e.g., the value and/or change in value of the operating parameter), and/or the resulting adjustment to the corresponding operating characteristic(s). In response to receiving user authorization tuning system 300 may set the value(s) of the operating parameter(s).

In some examples the user may give pre-authorization prior to tuning system 300 acquiring tune data and/or determining the value(s) of the operating parameter(s). For instance, tuning system 300 may provide, by way of a graphical user interface, a setting menu by which the user may provide user input to configure the tuning process, including how and when operating parameters are to be adjusted. Thus, if a user pre-authorizes tuning adjustments, tuning system 300 may automatically make the tuning adjustments in real-time (e.g., in response to determination of the value of the operating parameter).

In both idle-time tuning and run-time tuning, tuning system 300 may acquire a set of tune data during a batch of one or more analytical runs and determine, based on the set of tune data, one or more operating parameters. In some examples tuning system 300 may be configured to acquire multiple sets of tune data during multiple distinct idle-time periods and determine the value of one or more operating parameters based on the multiple sets of tune data. A set of tune data may refer to tune data acquired during a discrete period of time (e.g., a particular analytical run, a particular idle-time period, or a particular run-time period).

Figure 9:
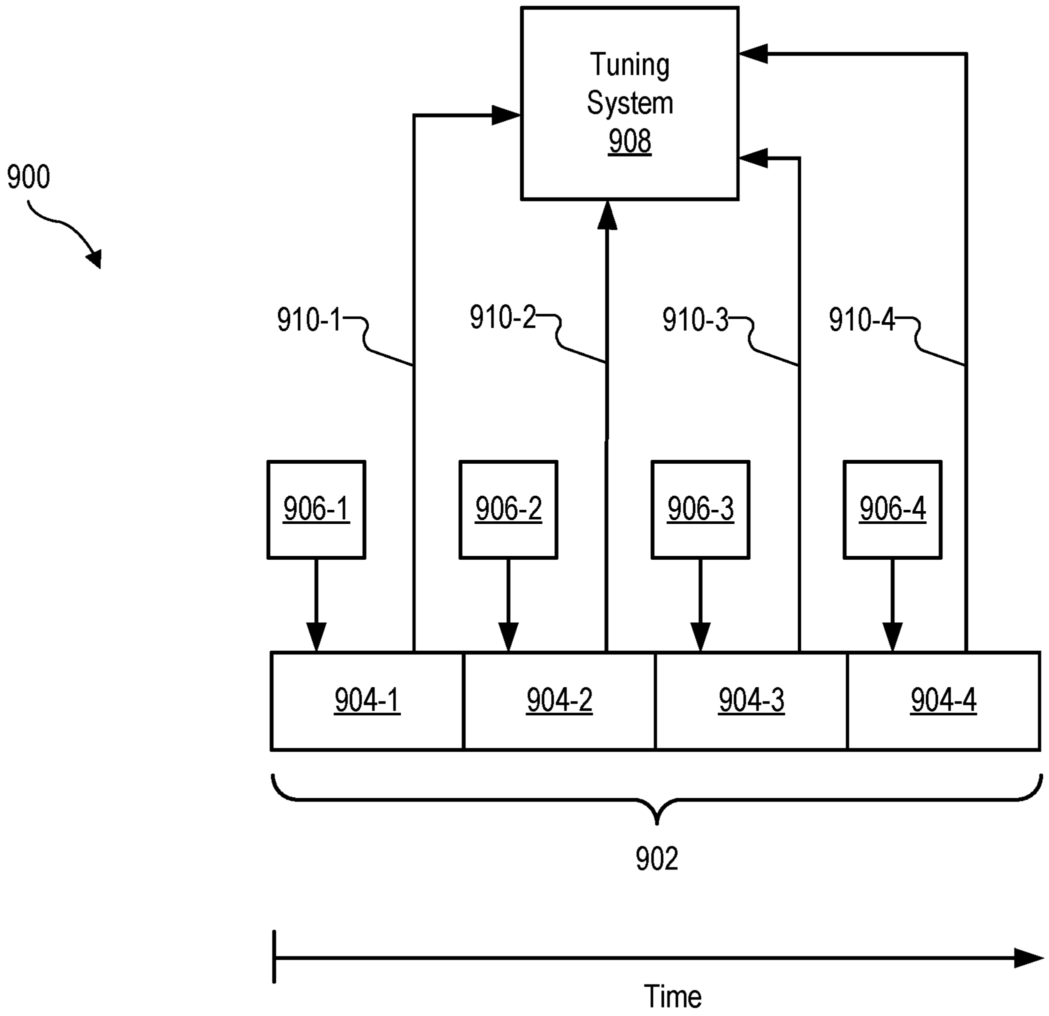
FIG. 9 illustrates a timing diagram of an exemplary workflow comprising a batch of analytical runs according to principles described herein.

FIG. 9 illustrates a timing diagram of an exemplary workflow 900 comprising a batch 902 of analytical runs 904 (e.g., analytical runs 904-1 through 904-4). Each analytical run 904 includes a run-time period (not shown) during which a mass spectrometer performs a mass analysis on an analytical sample 906 (e.g., one of analytical samples 906-1 through 906-4) and one or more idle-time periods (not shown) during which the mass spectrometer does not perform a mass analysis on an analytical sample 906. Although not shown, batch 902 may also include any number of additional idle-time periods as may suit a particular implementation. A tuning system 908 (e.g., tuning system 300) is configured to acquire multiple sets 910 of tune data (e.g., sets 910-1 through 910-4) during multiple distinct idle-time periods and/or run-time periods during batch 902. For example, tuning system 908 may acquire a first set 910-1 of tune data during a first idle-time period during analytical run 904-1, a second set 910-2 of tune data during a second idle-time period during analytical run 904-2, a third set 910-3 of tune data during a third idle-time period during analytical run 904-3, and a fourth set 910-4 of tune data during a fourth idle-time period during analytical run 904-4. Each set 910 of tune data may be acquired in any of the ways described herein.

In some examples a particular set 910 of tune data acquired during a particular idle-time period or run-time period (e.g., an idle-time period occurring during analytical run 904-1) may be insufficient for tuning system 908 to determine a value of a particular operating parameter. Accordingly, tuning system 908 may be configured to determine the value of the particular operating parameter based on multiple sets of tune data (e.g., based on sets 910-1 through 910-4).

Because tuning system 908 is configured to acquire multiple sets of tune data intermittently during multiple distinct idle-time periods and/or run-time periods, tuning system 908 may maintain a tuning log that identifies tune data that tuning system 908 has acquired so that tuning system 908 may continue the tuning process without substantial duplication of tuning tasks. For example, the tuning log may indicate that a value of an RF voltage amplitude applied to a quadrupole electrode varied from a first value to a second value during a first idle-time period during analytical run 904-1 and varied from the second value to a third value during a second idle-time period during analytical run 904-2. Accordingly, during analytical run 904-3 tuning system 908 may refer to the tune log and continue the tuning process by setting the RF voltage amplitude applied to the quadrupole electrode starting at the third value. In this way tuning system 908 may acquire, over multiple distinct analytical runs 904, multiple sets 910 of tune data that may be used to determine a value of an operating parameter without unnecessarily duplicating the acquisition of tune data.

In some examples multiple sets 910 (e.g., sets 910-1 through 910-4) of tune data acquired during multiple distinct idle-time periods and/or run-time periods (e.g., idle-time periods occurring during batch 902 and/or one or more other batches) may be sufficient for tuning system 908 to determine a value of multiple different operating parameters. For example, tuning system 908 may be configured to determine the value of multiple distinct operating parameters based on sets 910-1 through 910-4.

In some examples the tune data acquired by tuning system 908 may be sufficient to complete a full tuning process. A full tuning process (e.g., a complete autotune process) checks all operating characteristics, such as mass resolution, mass accuracy, detector gain, mass range, etc., specified by a set of tuning criteria (e.g., an established method or a tuning program) and sets a value of one or more operating parameters in such a way that the operating characteristics satisfy the set of tuning criteria. In some embodiments tuning system 908 may be configured to perform a full tuning process based on multiple sets of tune data acquired during a plurality of distinct idle-time periods and/or run-time periods occurring during multiple distinct analytical runs. For instance, tuning system 908 may determine a value of various different operating parameters based on sets 910-1 through 910-4 of tune data acquired during a plurality of distinct idle-time periods and/or run-time periods occurring during analytical runs 904-1 through 904-4. In this way a full tuning process may be completed without any burden to the user and without the need to interrupt a series of analytical runs to perform an autotune process. For instance, if an LC-MS system or a GC-MS system performs six analytical runs per hour and performs ten seconds of idle-time tuning and/or run-time tuning during each analytical run, a full tuning process could be completed in approximately two days without the need to set aside time for performing an autotune process.

In some examples determining the values of multiple distinct operating parameters completes a partial tune. As used herein, a partial tune may refer to a tuning process for less than all operating characteristics (e.g., a particular operating characteristic or a group of related operating characteristics) included in a full tuning process. For instance, a partial tune may include a detector tune, a mass resolution tune, a mass calibration tune, and the like or portions thereof. A partial tune may also refer to a tuning process that performs or completes only a portion of a tuning process for a particular operating characteristic. For example, a partial tune may acquire only a portion of tune data necessary to complete a detector tune, a mass accuracy tune, a mass resolution tune, or a lens tune. It will be recognized that the above-described partial tunes are only exemplary, as other partial tunes may be performed using multiple sets of tune data acquired during multiple distinct idle-time and/or run-time periods. Exemplary partial tunes are described below.

In some examples tuning system 300 may additionally or alternatively use the tune data acquired in an idle-time tuning process and/or a passive run-time tuning process to monitor performance of the mass spectrometer and perform a tune validation. A tune validation checks whether the current operating characteristics are out of tune, e.g., are within a particular specification (e.g., satisfy certain tuning criteria) or vary from a prior tune by more than a predetermined amount.

In some examples tuning system 300 may perform a tune validation by measuring one or more operating characteristics (e.g., mass resolution, mass accuracy, detector gain, etc.) based on the acquired tune data and comparing the measured operating characteristics with results from a prior tune (e.g., an autotune) and/or with a particular set of tuning criteria. If tuning system 300 determines that one or more operating characteristics of the mass spectrometer is out of tune (e.g., varies from the values of the prior tune or from the tuning criteria by more than a predetermined amount (e.g., exceeds a tolerance)), tuning system 300 may present a notification to the user and/or automatically schedule a tuning process to bring the operating characteristics within the tune specification.

Additionally or alternatively, tuning system 300 may be configured to perform a tune validation based on a statistical or machine-learning analysis of the passively-acquired tune data. For instance, tuning system 300 may use passively-acquired tune data to analyze the distribution of masses in the ion signals (or mass spectra) to determine whether the peak positions are sufficiently accurate. As another example, tuning system 300 may use passively-acquired tune data to statistically analyze peak widths and determine whether the mass resolution should be adjusted. Tuning system 300 may use any suitable statistical and/or machine-learning algorithm or heuristic to determine whether the current operating characteristics are out of tune. If tuning system 300 determines that one or more operating characteristics of the mass spectrometer is out of tune, tuning system 300 may present a notification to the user and/or automatically schedule a tuning process to bring the operating characteristics within the tune specification.

Exemplary tunes that may be performed by tuning system 300 using an idle-time tuning process and/or a run-time tuning process will now be described. It will be recognized that the following tunes are only illustrative and not limiting, as any other tunes may be performed by tuning system 300 as may suit a particular implementation. Additionally, the tunes described in the examples below may be performed in accordance with any of the systems and methods described herein.

Tuning system 300 may perform a mass range tune to ensure that the mass spectrometer is configured to scan an appropriate range of masses (e.g., an m/z range) for a particular method and/or analytical run. In a mass range tune one or more (or all) RF ion guides (e.g. a focusing lens, a collision cell, etc.) and mass filters may be checked to ensure that a value of their respective RF frequencies allow the RF amplitude to be ramped high enough to filter or transmit ions within the desired mass range. This is because the RF voltage amplitude for an ion guide or mass filter may depend on the mass range of interest and on the RF frequency.

Tuning system 300 may use an idle-time tuning process to perform the mass range tune. For example, tuning system 300 may direct a combined system to inject a tuning sample into a mass spectrometer during one or more idle-time periods that occurs during one or more batches of one or more analytical runs. During the idle-time periods, tuning system 300 may direct the mass spectrometer to perform, on the tuning sample, a series of analytical scans during which a range of RF frequencies are applied to the ion guides and/or mass filters. Tuning system 300 may acquire, as tune data, the ion signals detected by the detector during the idle-time period and determine, based on the detected ion signals, which RF frequency produces an optimal RF voltage. If tuning system 300 determines that the mass range is out of tune (e.g., that a present value of the RF frequency applied during a run-time period varies from the determined optimal RF frequency value by more than a predetermined threshold or tolerance), tuning system 300 may set the value of the RF frequency to the determined optimal value.

Tuning system 300 may perform a detector tune to check and set the gain of the detector. In the detector tune tuning system 300 may be configured to establish a gain curve and select, based on the gain curve, a value of a multiplier voltage to be applied to the detector (e.g., to the electron multiplier) to achieve a desired gain or signal intensity.

In some examples tuning system 300 may perform the detector tune in accordance with an idle-time tuning process. For example, tuning system 300 may direct the mass spectrometer to perform multiple analytical scans of a calibrant sample during one or more idle-time periods occurring during one or more batches of one or more analytical runs. Tuning system 300 may acquire the ion signals generated during the idle-time analytical scans and determine or calculate the detector gain based on the acquired ion signals. Tuning system 300 may calculate the detector gain in any suitable way, including but not limited to the Fies Method based on ion statistics (see Int. J. Mass Spectrom. Ion Processes, 1988, v 82, p 111-129, which is incorporated herein by reference), counting the number of ions hitting the detector, and the like. In some examples, such as when the Fies Method is used, the intensity of the ion beam may be adjusted by varying one or more operating parameters (e.g. an RF voltage applied to a mass filter) to ensure the assumptions of Poisson statistics are valid. Tuning system 300 may direct the mass spectrometer to vary, during the idle-time analytical scans, the multiplier voltage over a range and calculate a gain at each voltage. Tuning system 300 may then fit a curve the detector gain data and use the curve to determine the multiplier voltage that will give the desired detector gain.

Tuning system 300 may perform a mass resolution tune to check and/or adjust the width of mass peaks to achieve a desired resolution. Tuning system 300 may perform the mass resolution tune in accordance with an idle-time tuning process. For example, tuning system 300 may direct the mass spectrometer to perform multiple analytical scans of a calibrant sample during one or more idle-time periods occurring during one or more batches of one or more analytical runs. Tuning system 300 may direct the mass spectrometer to vary, during the idle-time analytical scans, the RF/DC voltage ramp rate for each calibrant ion at multiple scan rates. Tuning system 300 may acquire the ion signals generated from the idle-time analytical scans and establish, based on the acquired ion signals, a table of RF/DC voltage ramp rates and peak widths. Tuning system may use the table to determine the value of an RF/DC voltage ramp rate to achieve the desired resolution. In some examples, if tuning system 300 determines that mass resolution is out of tune, tuning system 300 may perform the mass resolution tune after performing the detector tune. Tuning system 300 may also perform the mass resolution tune again after performing a mass calibration tune and/or a lens tune, which are described below.

Tuning system 300 may perform a mass calibration tune to adjust the position of the apex of each of the mass peaks for calibrant ions by adjusting the RF voltage amplitude applied to one or more ion guides and/or mass filters. This ensures that the mass peaks are all at accurate positions in the mass spectra. Tuning system 300 may perform the mass calibration tune in accordance with an idle-time tuning process. For example, tuning system 300 may direct the mass spectrometer to perform multiple analytical scans of a calibrant sample during one or more idle-time periods occurring during one or more batches of one or more analytical runs. Tuning system 300 may direct the mass spectrometer to vary, during the idle-time analytical scans, the RF voltage amplitude for each calibrant ion at multiple scan rates. Tuning system 300 may acquire the ion signals generated from the idle-time analytical scans and establish, based on the acquired ion signals, a table of RF voltage amplitudes, which may be used by tuning system 300 to determine the value of an RF voltage amplitude to achieve the desired mass position.

Tuning system 300 may also perform a lens tune to optimize a lens voltage (e.g., an RF voltage) based on various criteria, such as the effect of the lens voltage on mass resolution, difference in the ion signal (e.g., intensity) from prior or optimal values, etc. Tuning system 300 may perform the lens tune in accordance with an idle-time tuning process. For example, tuning system 300 may direct the mass spectrometer to perform multiple analytical scans of a calibrant sample during one or more idle-time periods occurring during one or more batches of one or more analytical runs. Tuning system 300 may direct the mass spectrometer to vary, during the idle-time analytical scans, the lens voltage for each calibrant ion for each lens. Tuning system 300 may acquire the ion signals generated from the idle-time analytical scans and establish, based on the acquired ion signals, a table of mass (m/z) and lens voltage amplitudes, which may be used by tuning system 300 to maximize the transmission of ions under different conditions.

In the examples described above, tuning system 300 may perform the mass range tune, the detector tune, the mass resolution tune, the mass calibration tune, and/or the lens tune during an idle-time period. However, tuning system 300 may additionally or alternatively perform any one or more these tunes during a run-time period, such as an initial portion of a run-time period prior to elution of the first component from the separation system (e.g., from time $t_1$ to time $t_2$ during run-time period 520 in FIG. 8).

Figure 10:
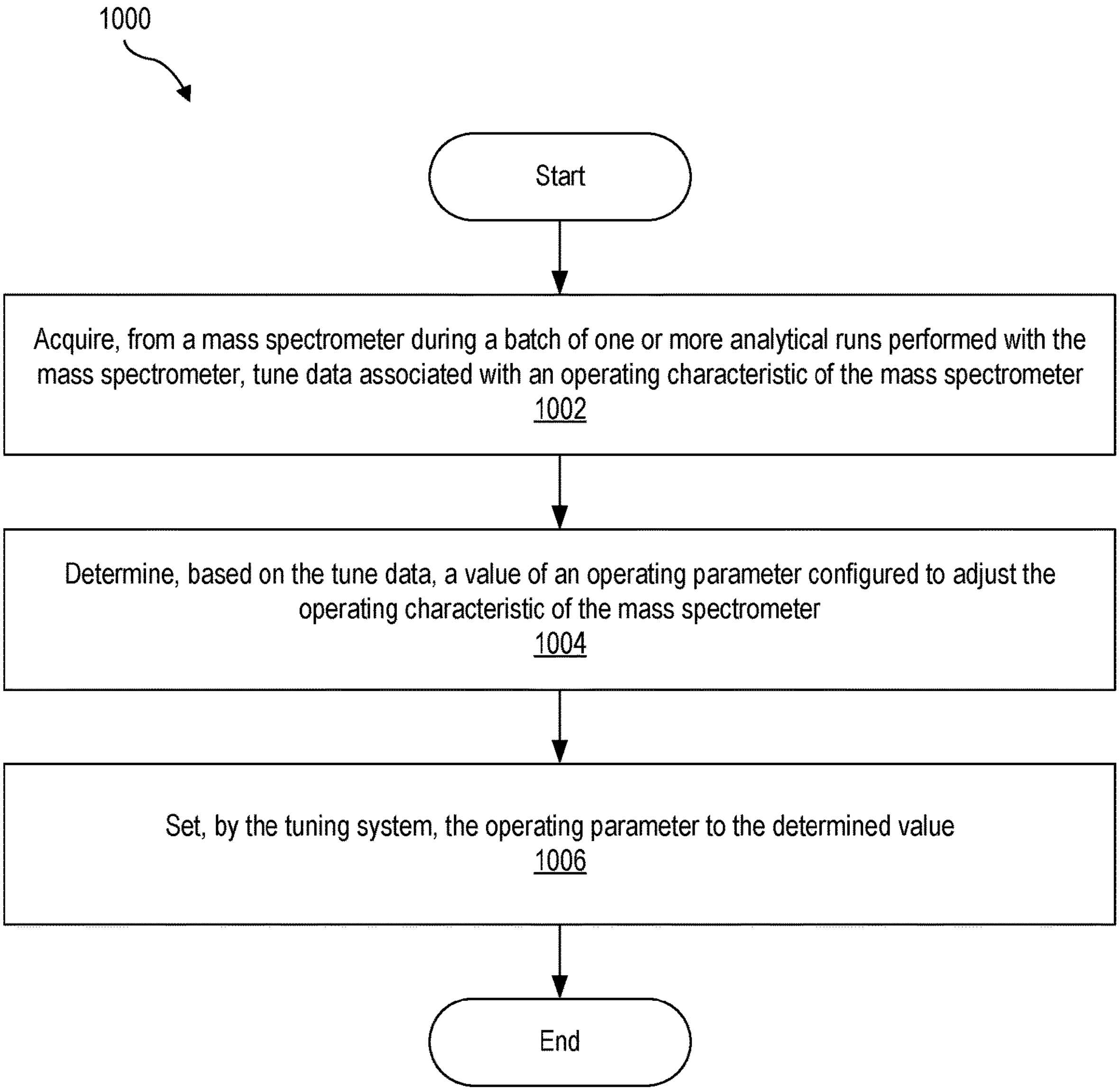
FIG. 10 illustrates an exemplary method according to principles described herein.

FIG. 10 illustrates an exemplary method 1000 of tuning a mass spectrometer. While FIG. 10 illustrates exemplary operations according to one embodiment, other embodiments may omit, add to, reorder, and/or modify any of the operations shown in FIG. 10. One or more of the operations shown in FIG. 10 may be performed by tuning system 300, by any components included therein, and/or by any implementation thereof.

In operation 1002, a tuning system acquires, from a mass spectrometer during a batch of one or more analytical runs performed with the mass spectrometer, tune data associated with an operating characteristic of the mass spectrometer. Operation 1002 may be performed in any of the ways described herein.

In operation 1004, the tuning system determines, based on the tune data, a value of an operating parameter configured to adjust the operating characteristic of the mass spectrometer. Operation 1004 may be performed in any of the ways described herein.

In operation 1006, the tuning system sets the operating parameter to the determined value. Operation 1006 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
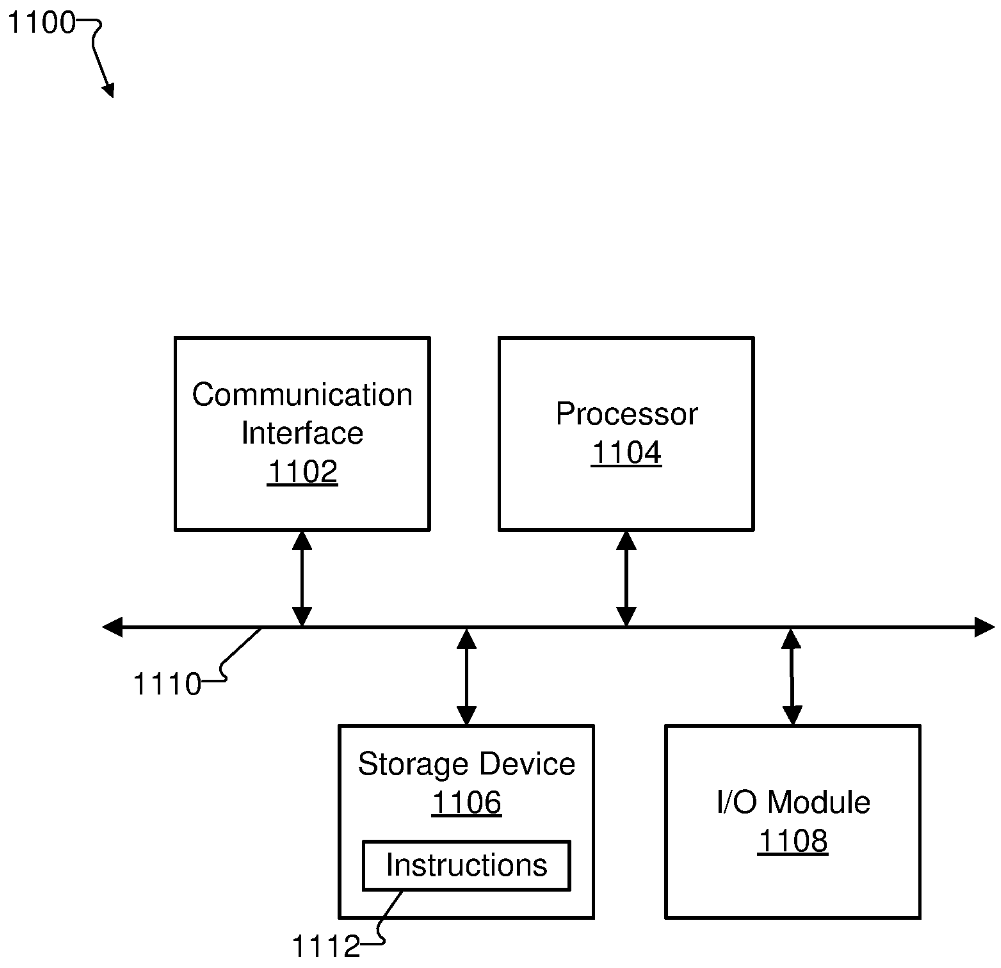
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected one to another via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data and/or interpreting, executing, and/or directing execution of one or more of the instructions, processes, and/or operations described herein. Processor 1104 may perform operations by executing computer-executable instructions 1112 (e.g., an application, software, code, and/or other executable data instance) stored in storage device 1106.

Storage device 1106 may include one or more data storage media, devices, or configurations and may employ any type, form, and combination of data storage media and/or device. For example, storage device 1106 may include, but is not limited to, any combination of the non-volatile media and/or volatile media described herein. Electronic data, including data described herein, may be temporarily and/or permanently stored in storage device 1106. For example, data representative of computer-executable instructions 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1100. For example, storage facility 302 may be implemented by storage device 1106, and processing facility 304 may be implemented by processor 1104.

It will be recognized by those of ordinary skill in the art that while, in the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

injecting a tuning sample into a mass spectrometer during one or more run-time periods occurring during a batch of one or more analytical runs performed with the mass spectrometer, the one or more run-time periods including a time period between injecting a sample into a separation system and a first component of the sample reaching the mass spectrometer;

acquiring, by a tuning system from a mass spectrometer during the one or more run-time periods, tune data associated with an operating characteristic of the mass spectrometer;

determining, by the tuning system based on the tune data, a value of an operating parameter configured to adjust the operating characteristic of the mass spectrometer; and setting, by the tuning system, the operating parameter to the determined value.

2. The method of claim 1, wherein the setting of the operating parameter to the determined value is performed in response to the determination of the value.

3. The method of claim 1, further comprising:

requesting, by the tuning system, user authorization to set the operating parameter to the determined value; and setting, by the tuning system in response to receipt of the user authorization, the operating parameter to the determined value.

4. The method of claim 1, wherein the tune data is based on ion signals generated from an analysis of a known chemical compound of the tuning sample performed with the mass spectrometer during the one or more run-time periods.

5. The method of claim 1, wherein:

the tune data is representative of mass resolution, and the operating parameter comprises a voltage ramp rate for a mass analyzer included in the mass spectrometer.

6. The method of claim 1, wherein:

the tune data is representative of a detector gain of a detector included in the mass spectrometer, and the operating parameter comprises a voltage applied to an electron multiplier included in the detector.

7. The method of claim 1, wherein the tune data is representative of mass position, and the operating parameter comprises an amplitude of a radio frequency ("RF") voltage applied to a mass analyzer included in the mass spectrometer.

8. A system comprising:

a memory storing instructions; and a processor communicatively coupled to the memory and configured to execute the instructions to:

inject a tuning sample into a mass spectrometer during one or more run-time periods occurring during a batch of one or more analytical runs performed with the mass spectrometer, the one or more run-time periods including a time period between injecting a sample into a separation system and a first component of the sample reaching the mass spectrometer;

acquire, from a mass spectrometer during one or more run-time periods, tune data associated with an operating characteristic of the mass spectrometer;

determine, based on the tune data, a value of an operating parameter configured to adjust the operating characteristic of the mass spectrometer; and set the operating parameter to the determined value.

9. The system of claim 8, wherein the processor is configured to execute the instructions to set the operating parameter to the determined value in response to the determination of the value.

10. The system of claim 8, wherein the processor is further configured to execute the instructions to:

request user authorization to set the operating parameter to the determined value; and set, in response to receipt of the user authorization, the operating parameter to the determined value.

11. The system of claim 8, wherein the processor is configured to execute the instructions to acquire the tune data during one or more run-time periods occurring during the batch of one or more analytical runs.

12. The system of claim 11, wherein the tune data is based on ion signals generated from an analysis of a known chemical compound of the tuning sample performed with the mass spectrometer during the one or more run-time periods.

13. A non-transitory computer-readable medium storing instructions that, when executed, direct at least one processor of a computing device to:

send instructions to inject a tuning sample into a mass spectrometer during one or more run-time periods occurring during a batch of one or more analytical runs performed with the mass spectrometer, the one or more run-time periods including a time period between injecting a sample into a separation system and a first component of the sample reaching the mass spectrometer;

acquire, from a mass spectrometer during one or more run-time periods, tune data associated with an operating characteristic of the mass spectrometer;

determine, based on the tune data, a value of an operating parameter configured to adjust the operating characteristic of the mass spectrometer; and set the operating parameter to the determined value.

* * * * *